US007313564B2

(12) United States Patent
Melamed et al.

(10) Patent No.: US 7,313,564 B2
(45) Date of Patent: Dec. 25, 2007

(54) WEB-INTERACTIVE SOFTWARE TESTING MANAGEMENT METHOD AND COMPUTER SYSTEM INCLUDING AN INTEGRATED TEST CASE AUTHORING TOOL

(75) Inventors: Konstantin Melamed, Walnut Creek, CA (US); Yevsey Melamed, Brooklyn, NY (US)

(73) Assignee: Symbioware, Inc., Walnut Creek, CA (US)

( * ) Notice: Subject to any disclaimer, the term of this patent is extended or adjusted under 35 U.S.C. 154(b) by 636 days.

(21) Appl. No.: 10/720,055

(22) Filed: Nov. 25, 2003

(65) Prior Publication Data

US 2004/0107415 A1    Jun. 3, 2004

Related U.S. Application Data

(60) Provisional application No. 60/430,378, filed on Dec. 3, 2002.

(51) Int. Cl.
*G06F 17/30*    (2006.01)
*G06F 7/00*    (2006.01)
(52) U.S. Cl. .................. 707/101; 707/10; 707/102
(58) Field of Classification Search ............... 707/102, 707/101, 10
See application file for complete search history.

(56) References Cited

U.S. PATENT DOCUMENTS

| 2002/0028430 A1* | 3/2002 | Driscoll et al. | 434/322 |
| 2002/0095436 A1* | 7/2002 | Lee | 707/203 |
| 2003/0033406 A1* | 2/2003 | John et al. | 709/224 |
| 2003/0084120 A1* | 5/2003 | Egli | 709/218 |
| 2004/0216139 A1* | 10/2004 | Rhoda et al. | 719/320 |

OTHER PUBLICATIONS

Glenn et al.: IPsec-WIT : The NISP Ipsec Web-based Interoperability Test System, National Institute of Standards and Technology, 2000.*
Hogan et al.: Information Technology Measurement and Testing Activities at NIST, Journal of Research of the National Institute of Standards and Technology, vol. 106, No. 1, Jan.-Feb. 2000.*
Glenn et al.: IPsec-WIT : The NISP Ipsec Web-based Interoperability Test System, National Institute of Standards and Technology, 2000 (previously provided).*
Hogan et al.: Information Technology Measurement and Testing Activities at NIST, Journal of Research of the National Institute of Standards and Technology, vol. 106, No. 1, Jan.-Feb. 2000 (previously provided).*

* cited by examiner

*Primary Examiner*—John Cottingham
*Assistant Examiner*—Kuen S. Lu
(74) *Attorney, Agent, or Firm*—Michael Shmilovich

(57) ABSTRACT

A method and computer system for web-interface mediated software testing is disclosed. The computer system includes an application server that provides a web interface for organizing and managing test cases by organizing test cases by the Requirements and Sub-Requirements of a Project. Users can schedule test cases to run on one or more host machines that have loaded thereon a copy of the software being tested, or some part thereof, and an automation tool. The host machine derives test scripts by parsing automation tool recognized syntax from the steps and procedures encoded in the test case files and downloads the appropriate automation tool GUI environment file and running the test script using the automation tool against the software application, or some part thereof, being tested. The progress of each test case or test step can be monitored remotely via the web interface without the need for direct interaction with a host machine. A test case can be generated by an Integrated Test Case Authoring Tool which provides a GUI that translates user keystrokes and mouse actions into strings recognized by standard automation tools.

15 Claims, 20 Drawing Sheets

| HOST NAME | TIME ZONE | DESCRIPTION | AUTOMATED TOOL |
|---|---|---|---|
| s3 | USA-San Francisco | | Yes |
| trust | USA-San Francisco | | Yes |
| newH | USA-San Francisco | | Yes |
| kmlaptop | USA-Chicago | | Yes |
| yevsey | USA-San Francisco | | Yes |
| yevseyhome | Russia-Kamchatka | | Yes |
| ll | Spain | | Yes |
| Moscow-Petushki | USA-San Francisco | | Yes |
| test delete | Russia-Moscow | | Yes |
| Moscow(Bolashyha) | Argentina | | No |
| aaa | Afghanistan | host 1 | Yes |
| s | Argentina | same host | No |
| q | USA-San Francisco | yan | Yes |
| dell | Indonesia-Bali | | Yes |
| fqdfd | Egypt | | Yes |
| lina desk | Ghana | | Yes |
| lina@ desk | Ghana | | Yes |
| lina#desk | Argentina | fdgdhfdgsdgf687967806 | No |
| wertewtwe4556 | Australia-Melbourne | | Yes |
| dfgd | Australia-Darwin | | Yes |
| sdfgdfsafsdad | Australia-Perth | 456 | Yes |
| 123 | USA-San Francisco | | Yes |
| dummy | USA-San Francisco | | Yes |
| larisa | USA-San Francisco | | No |
| larisa1 | | | |

WEB-INTERACTIVE SOFTWARE TESTING MANAGEMENT METHOD AND COMPUTER SYSTEM INCLUDING AN INTEGRATED TEST CASE AUTHORING TOOL

CROSS REFERENCE TO RELATED APPLICATION

This application claims priority to U.S. Provisional Patent Application Ser. No. 60/430,378, filed Dec. 3, 2002, herein incorporated by reference in its entirety.

BACKGROUND OF THE INVENTION

1. Field of the Invention

The invention relates generally to the field of computer science and specifically to the field of software development and testing.

2. Background Art

As object-oriented software development becomes more complex, so does the ability to efficiently test software applications. It is estimated that more than 70% of the budgets of software development projects are allocated to testing, debugging, and maintaining the software and only 30% to the costs associated with design and coding. One of the problems encountered by software developers and testers involved in complex software projects is the insufficiency of documentation that conveys Requirements specifications. "Requirements" are the details describing the externally perceived functionality and properties of the application. Requirements should be clear, complete, reasonably detailed, cohesive, attainable, and most preferably "testable." A non-testable requirement would be, for example, the notion that the application is 'user-friendly,' which is subjective rather than objectively testable through end-user interaction with the application. A testable requirement, for example, would be one in which "the user must enter their previously-assigned password to access the application."

Determining and organizing Requirements details usefully and efficiently is complex. Several books are available that suggest various approaches to this task (See Robertson, S., et al., Mastering the Requirements Process, Addison-Wesley Pub Co (2000), and see Weigersm K. et al., Software Requirements, Microsoft Press (1999)).

The Requirements of all potential end users should be considered when generating a comprehensive strategy for testing the software application. Users can be, for example, end-users, customer acceptance testers, customer contract officers, customer management, future software maintenance engineers, sales-people, or anyone who could later "derail" the project if their expectations are not met. In some organizations, requirements may end up in high-level project plans, functional specification documents, in design documents, or in other documents at various levels of detail.

Additionally, current software testing methodologies are encumbered by difficulties associated with learning automation tools (e.g., WinRunner available from the Mercury Interactive Corporation, SilkTest available from Segue Software Inc., or Rational Robot available from the Rational Software Corporation), the scripting languages used by automation tools.

Some attempt has been made to integrate both requirements organization and testing. The SilkTest automation tool, for example, comes integrated with "SilkPlan Pro," an application for creating a test plan and then linking the automation scripts to the test plan. "SilkPlan Pro" can also be used to track the automation process and control the execution of selected groups of test cases. One or more user defined attributes are assigned to each "test case" and later used in test plan queries to select a group of tests for execution. A test case is a file or document that describes an input, action, or event and an expected response, to determine if a feature of an application is working per the Requirements. A test case preferably contains the particulars, e.g., test case identifier, test case name, objective, test conditions/setup, input data requirements, steps, and expected results. There is also a modest capability to add manual test placeholders in the test plan, and then manually add pass/fail status to the results of a full test run.

The automation tool WinRunner integrates a web enabled program called "TestDirector;" for visually creating a test project and then linking WinRunner scripts to the project. "TestDirector" is a database repository based application that provides a variety of tools to analyze and manipulate the various database tables and test results stored in the repository for the project. Using a visual recorder, test cases are added to one or more Test Sets for execution as a group. TestDirector also provides user with the means for authoring manual test cases (e.g., describing each test step and its expected results), interactively executing each manual test, and then saving the pass/fail status for each test step in the repository.

Commercially available automation tools include only rudimentary management and authoring features limited to isolated machines containing the automation tool and the software being tested. Software testing, however, is a team effort that requires symbiotic cooperation between the various software testers who need not be software developers themselves. Also, software testers need not be limited geographically to conduct the software testing.

As such the present invention provides a unified multi-user platform that manages testing requirements, assigning test cases for execution, and includes a graphical user interface (GUI) driven test case authoring tool that appends test steps using syntax recognized by the automation tool chosen to perform the test.

SUMMARY OF THE INVENTION

The invention is directed to a method and computer system that include a web-interactive interface that permit one or more users with or without knowledge of test scripting to manage and run test cases on local or remote host machines. The management interface allows users to: (a) create their own test cases using a GUI that appends test case steps using a syntax recognized by the automation tool chosen to perform the test (b) manage and organize Requirements visually using the web interface, and (c) schedule automated testing by assigning one or more test cases to be run on one or more host machines; the host machines including a whole or partial copy of the software application being tested and an automation tool for executing the steps of the test case.

One aspect of the invention is a method of software testing where a user accesses a web interface provided by an application server, selects a test case using the web interface, selects a host machine on which to execute the test case; the application server then transmits a files associated with a selected test case from the application server to the selected host machine; the files includes the steps of the test case to be executed by the automation tool and automation tool GUI environment file(s) and is parsed into an automation tool recognized test script; the host machine then executes the steps of the case using an automation tool loaded onto said host machine.

Also provided is a method for sending updated status information about an executed test case and the status of its included steps from the host machine to the application server and providing the status information by way of the web interface.

In an exemplary embodiment of the invention the file associated with the test case can be any type of file including without limitation to a flat file, markup language encoded file, XML file, ASCII file, HTML file, or XHTML file.

Another aspect of the invention a test case can be scheduled (e.g., date and time) for execution on one or more host machines.

Also provided is a method for authoring a test case using a web interface wherein steps or procedures are added to the test case or existing steps or procedures are modified in the test case by choosing from a plurality of preset GUI objects or by adding special objects (e.g., Database, Date, File, Loop, and Manual Step objects). The GUI objects being present in the application to be tested. Users can include actions and their expected results into the test case steps by entering one or more keystrokes into a procedure field associated with the step.

The invention further provides a computer system and method for managing software testing requirements wherein a users can create a requirements folder using a web interface and wherein the requirements folder is saved in a relational database coupled to an application server that provides the web interface, the user can further use the web interface to create a test case using a web interactive authoring tool and saving the test case in the relational database coupled to the application server, users can sort a test case within a requirements folder, and a user can create a sub-requirements folder using the web interface and saving the sub-requirements folder in the requirements folder; wherein both the requirements and the sub-requirements folders are saved in the relational database coupled to the application server that provides the web interface.

A computer system is also provided which includes an application server suitable to function as a web server and suitable to provide a web interface, wherein the web interface allows a user to assign a test cases to a host machine for execution, a database operatively coupled to the application server, one or more user machines in communication with the application server suitable to enable the one or more users to interact with the web interface, and one or more host machines in communication with the application server, the one or more host machines comprising an automation tool and a full or partial copy of a computer program suitable for testing.

The computer system also includes means for transmitting a file associated with a test case to a host machine; the host machine has means for parsing out the name of an automation tool GUI environment file(s) from the transmitted file and requesting the transmission of the automation tool GUI environment file(s) from the application server. The host machine includes means for generating a test script from test case step information included in the transmitted file and executing the test script using an automation tool. The host machine also includes means for updating the application server with the status of a test case and the status of any step included in the test case.

BRIEF DESCRIPTION OF THE DRAWINGS

The foregoing and other features and advantages of the invention will be apparent from the following description of exemplary embodiments and as illustrated in the accompanying drawings. The invention includes web-interactive interfaces. As such, web pages can include many GUI objects whose structure and function would be apparent to a person having ordinary skill in the art and are not meant to limit the scope of the claims.

FIG. 4 is a screenshot of the Requirements tab/Requirements Info sub-tab of the web-interactive interface which enables a user to view or modify the general description of a Requirement.

FIG. 10 is a screenshot of the Run Manager tab/Host Manager sub-tab of the web-interactive interface which enables users to view the list of available host machines whereon a test case can be run.

Figure 1:
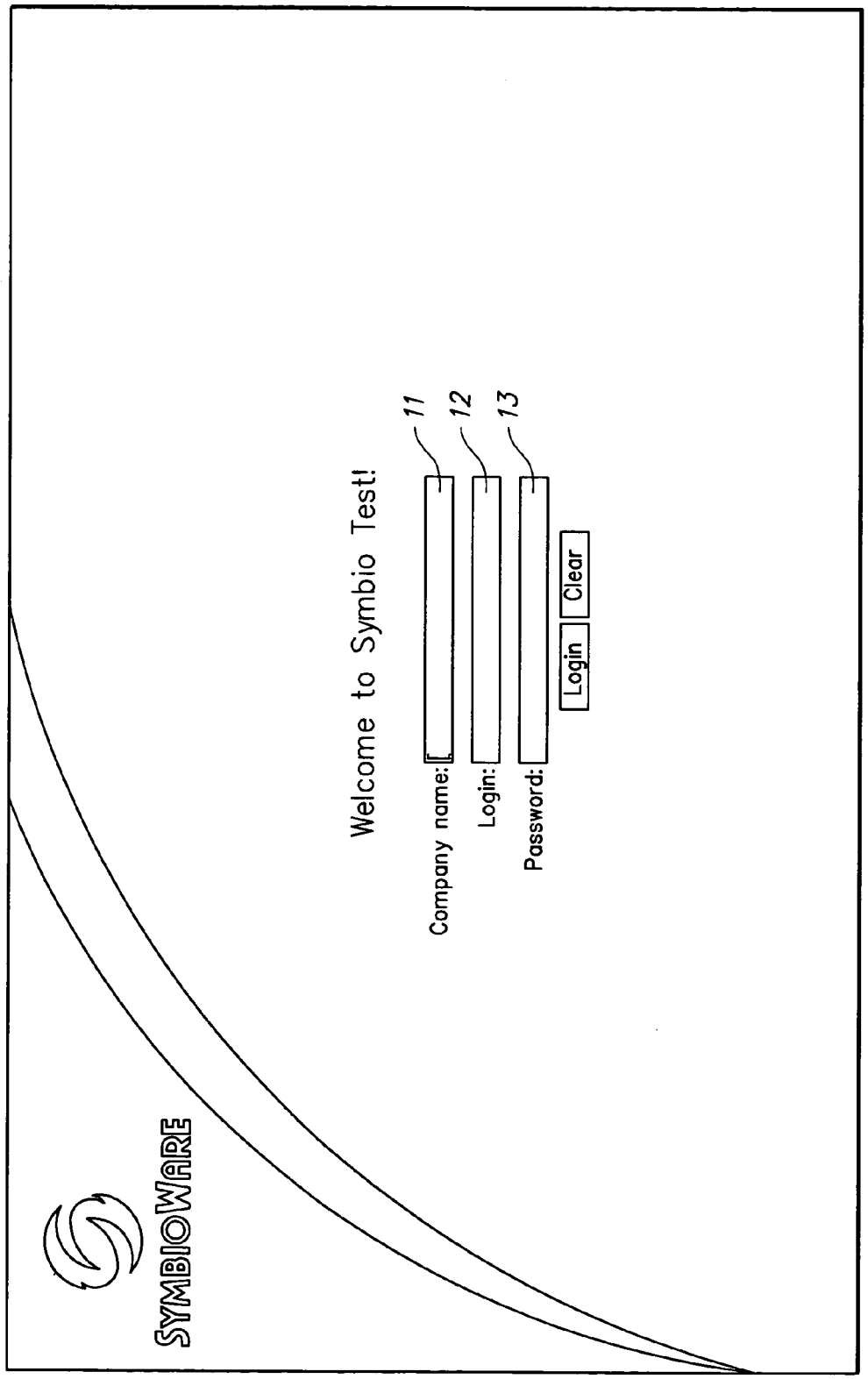
FIG. 1 is a screenshot of a login screen by which a user accesses the web-interactive testing management interface.

The foregoing figures are provided for purposes of illustration and not limitation and in no way limit the scope of the claims.

DETAILED DESCRIPTION OF THE INVENTION

For generating software testing strategies it is preferred that software testers: (a) obtain Requirements, functional design, internal design specifications, and other necessary documents, (b) obtain budget and schedule requirements, (c) hire project-related personnel and allocate responsibilities, reporting requirements, required standards and processes (e.g., release processes, change processes, etc.), (d) identify the higher-risk aspects of the application, set priorities, and determine scope and limitations of tests, (e) determine test approaches and methods—unit, integration, functional, system, load, usability tests, (f) determine test environment requirements (hardware, software, communications, etc.), (g) determine automation tool requirements record/playback tools, coverage analyzers, test tracking, problem/bug tracking, etc.), (h) determine test input data requirements, (i) identify tasks, those responsible for tasks, and labor requirements, (j) set schedule estimates, timelines, milestones, (k) determine input equivalence classes, boundary value analyses, and error classes, (l) prepare a test plan document and have needed reviews/approvals, (m) write test cases, (n) prepare test environment and automation tools, obtain needed user manuals/reference documents/configuration guides/installation guides, set up test tracking processes, set up logging and archiving processes, set up or obtain test input data, (o) obtain and install software releases on various host machines, (p) perform tests, (q) evaluate and report results, track problems/bugs and fixes, retest as needed, (r) maintain and update Test Plans, test cases, test environment, and automation tools.

The invention provides a web-interactive interface where the forgoing can be automated and implemented on a unified platform and shared among one or more users who may be separated geographically. As used herein the terms "web-interactive interface," "web interactive" or "web interface" are interchangeable and describe or include graphical user environments provided by the application server/web server and which are accessible, navigable, perceivable by the one or more users and which are suitable for user interaction therewith using typical web browsers known in the art (e.g., Microsoft Internet Explorer, Netscape Navigator, NSCA Web Browser, Lynx, Real.com Browser, etc.), the terms also include any non-web based client software capable of accessing the application server and providing a user with a GUI with which to interact with the application server and by which to implement the computer system and method of the invention.

The application server can be implemented on any general purpose computer that preferably includes a microprocessor (e.g., Intel, Motorola, AMD, Cyrix, etc.), random access and read only memory, software and data storage means (e.g., hard disk, floppy, CD-ROM/RW/RWRewrite, DVD-ROM/RW/RWRewrite, removable storage media, magneto-optical, or DAT drive), any combination of one or more input/output peripherals, e.g., a keyboard; pointing device or touch pad capable of moving a pointer and clicking at objects displayed on a video output device; a monitor or other video output device, and a bus to interface the forgoing components. The application server is preferably suitable to (a) have web hosting capability, (b) enable remote user login, (c) provide the web-interface to a user and include computer program logic enabling gathering and storing data and information from a database used to populate the content of the web-interface (d) to have sufficient memory and storage to enable multiple user logins and simultaneous multi-user usage (e) to have sufficient memory and storage to store automation tool GUI environment files associated with an application to be tested and to store test plan files which include textual details of the testing strategy.

Data transmissions to and from the application server can be achieved by a plurality of methods known in the art, for example, a plurality of network protocols, e.g., IPX, NetBUI, AppleTalk, LocalTalk, and preferably, TCP/IP, HTTP, and HTTPS.

Any operating system can be used as the platform loaded onto the application server, for example, Microsoft Windows 98, Windows NT, Windows 2000, Windows XP, MacOS, UNIX (SunOS, Solaris, Linux, or any other flavor of UNIX), or SGI-OS, the operating system is preferably enabled or can be coupled with web-hosting software, the web-hosting software enabled for HTTP, HTTPS, XML, Java, JSP, J2EE, ASP.NET Framework, ASP, ASP.NET, Visual C#.NET, Visual J#.NET, Visual Basic NET, Javascript, CGI, SSL, and SQL.

To access the web-interface provided by the application server, one or more users may use a similar general-purpose computer similar to the type described above and preferably a general-purpose computer with web-browser software capable of displaying a web interface; sending data to and receiving data from the web-interface provided by the application server.

Host machines also may be similarly configured to the general purpose computers described above and preferably include the software application being tested, or any logical part thereof, and a copy of an automation tool used for testing the software application (e.g., WinRunner, SilkTest, Rational Robot). The host machine is preferably intranet and extranet enabled, and most preferably also internet and web-enabled so that it can access the application server remotely and should include software suitable to receive files encoded using a plurality of markup languages (more infra), scripts and/or computer program code for parsing any and all strings in the encoded files into test scripts recognized by the automation tool, similar program code for encoding flat files like XML, HTML, XHTML files or any other flat file format that can later be decoded, and provide the automation tool with the parsed strings so that the automation tool can generate test scripts and run them against the software application being tested.

Figure 19:
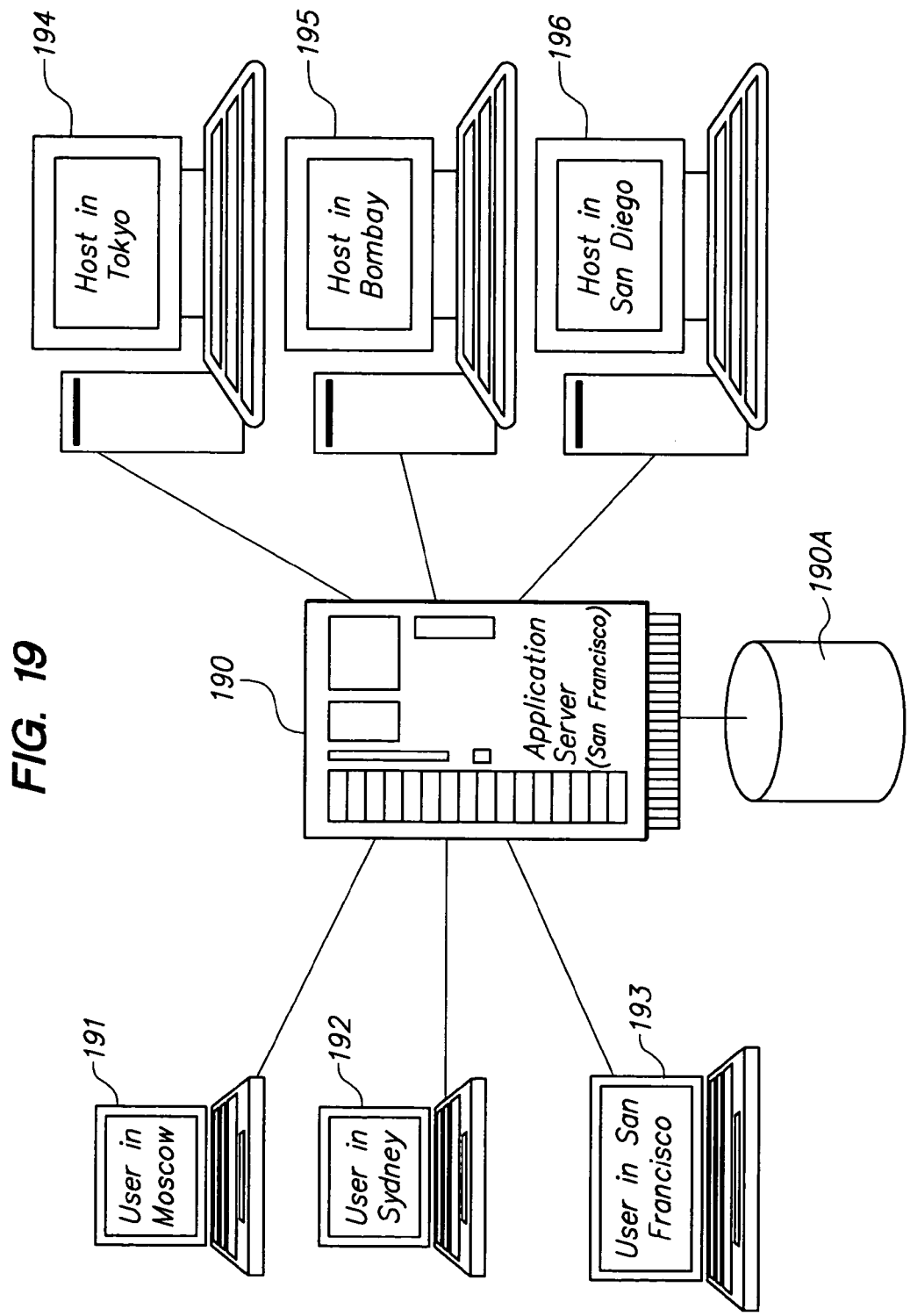
FIG. 19 is a schematic representation of the computer system of the invention.

Turning now to FIG. 19, a schematic shows an exemplary computer system of the invention. User machine 191 belongs to a user situated in Moscow, Russia remotely accessing a web-interface provided by an application server 190 located in San Francisco, Calif. User machine 192, and 193, situated in Sydney, Australia and San Francisco, Calif., respectively, similarly access the web-interface provided by application server 190. It is within the scope of the invention and apparent to the skilled artisan that users may access an application server 190 remotely from any geographic location by way of the internet, by Wide Area Network, by Local Area Network, or by a physical cable mediated interface directly to application server 190.

Application server 190 having coupled database 190A (which could be housed on a separate computer or on the same computer as application server 190 and which may be a physical component of application server 190) dispatches data to and receives data from various host machines, for example, Host machines 194, 195, and 196 located in Tokyo, Japan; Bombay, India; and San Diego, Calif., respectively. It is within the scope of the invention and it would be apparent to the skilled artisan that host machines may access application server 190 remotely from any geographic location via the internet, via a Local Area Network, via a Wide Area Network, or by a physical cable mediated interface with the application server 190, itself. In an exemplary embodiment, the user machine(s) transmit data between the application server, while being prevented from "seeing" or accessing the host machines by a firewall provided by the application server. In this embodiment the host machines communicate solely with application server 190. Users initiate test case executions first by submitting requests to application server 190. Host machines detect that a test case has been scheduled for execution thereon by accessing the information from the application server 190 (more infra).

The data transmissions between application server 190 and host machines 194–196 preferably include the transmission of test cases, the included steps and procedures of which are encoded into an XML file and parsed by a script and/or other computer program code loaded on the host machine into strings readable by the software testing automation tool which generates a test script from the parsed XML file. Upon running the test script, the host machine transmits the status of the executed test case and/or its included steps back to the application server. Test status can include, for example, that the test executed successfully, that the test failed, that the test has been stopped, or that the test has been paused by a user managing the test from the application server.

Web-Interactive Software Testing Management

Turning now to FIG. 1, a user accesses the web-interactive interface by logging into the web-interface by, for example, entering their company name into field 11, their User Name into field 12, and their Password into field 13. Typical web browser software known in the art includes functionality that enables users to re-login to a website by way of application server generated cookies, histories, recalled keystrokes or other means by which a user's login and password is recalled automatically. Other software functionality (e.g., macros, login scripts, or other means of authentication) that enables access by automatic login can be used.

Upon authenticating to the application server, a user is granted access to the web-interface depending on their respective permissions and their security level. This may grant a user access to certain Projects while restricting them from others. Additionally, this may restrict a user's access to certain Requirements, Sub-Requirements, and/or test cases within the Sub-Requirements.

Figure 2:
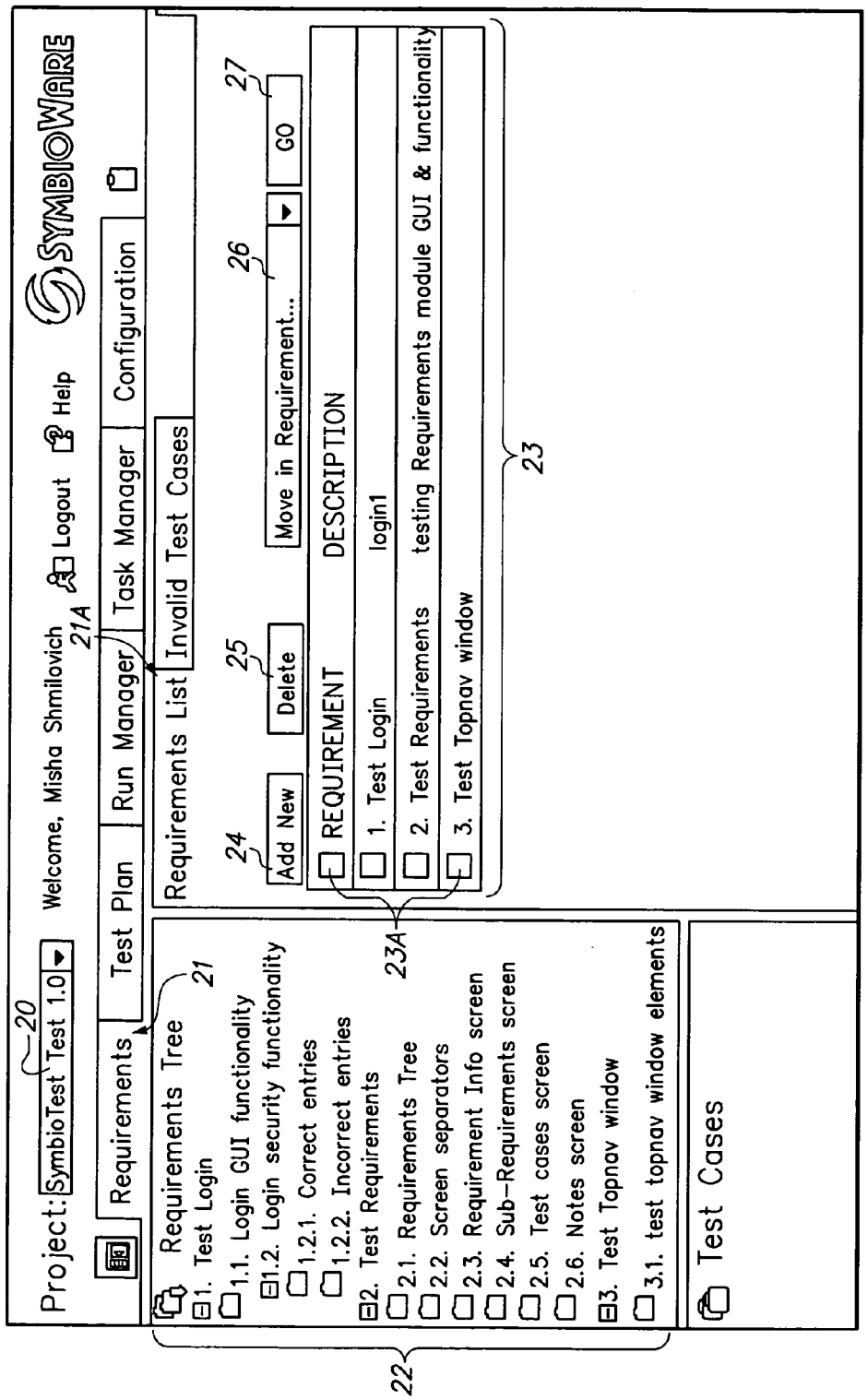
FIG. 2 is a screenshot of the Requirements tab/Requirements List sub-tab of the web-interactive interface which enables a user to navigate through an organizational tree of one or more Requirements, any included Sub-Requirements, and any included test cases.

Turning now to FIG. 2, the application server provides the user with a web interface for organizing a testing strategy for a particular application. Each application intended to be tested or managed can be selected as a "Project" using pull-down menu 20 and preferably consists of a one or more Requirements, one or more Sub-Requirements included in the Requirement(s), and one or more test cases included in each Sub-Requirement(s), wherein each test case comprised a series of sequential steps and procedures used to test the whole application or segments of application code. While Requirements tab 21 and Requirements List sub-tab 21A are selected and remain active, a user can view Requirements Tree 22 showing the organization of each Requirement and its included Sub-Requirements. For example, as shown in Requirements Tree 22, there are three Requirements folders: "1. Test Login," "2. Test Requirements," and "3. Test Topnav window." The Requirements folders can be the highest and most general level of organization of functionality in an application sought to be tested. Requirements Tree 22 provides collapsible lists in which a user may expand and collapse Requirements folders and any included Sub-Requirements.

Table 23 provides a listing of available Requirements for a selected Project and provides the user with check boxes 23A with which to select any one Requirement in order to manipulate it. By selecting a Requirement by way of a check-box, a user may delete a Requirement from the Project by subsequently clicking Delete Button 25, or a user may which to add a new Requirement for testing by clicking Add New Button 24. If a user selects to make a new Requirement they are prompted with a screen (not shown) with fields in which the name of the Requirement and a brief description can be entered.

Depending on the organizational strategy chosen, a user may transplant one Requirement into another, thus making it a Sub-Requirement, by clicking on the one or more check-boxes provided in Table 23 corresponding to the one or more Requirements they which to transplant and using pull-down menu 26 to indicate the destination Requirement into which to transplant the selected one or more selected Requirements, and subsequently by pressing Go Button 27.

Figure 3:
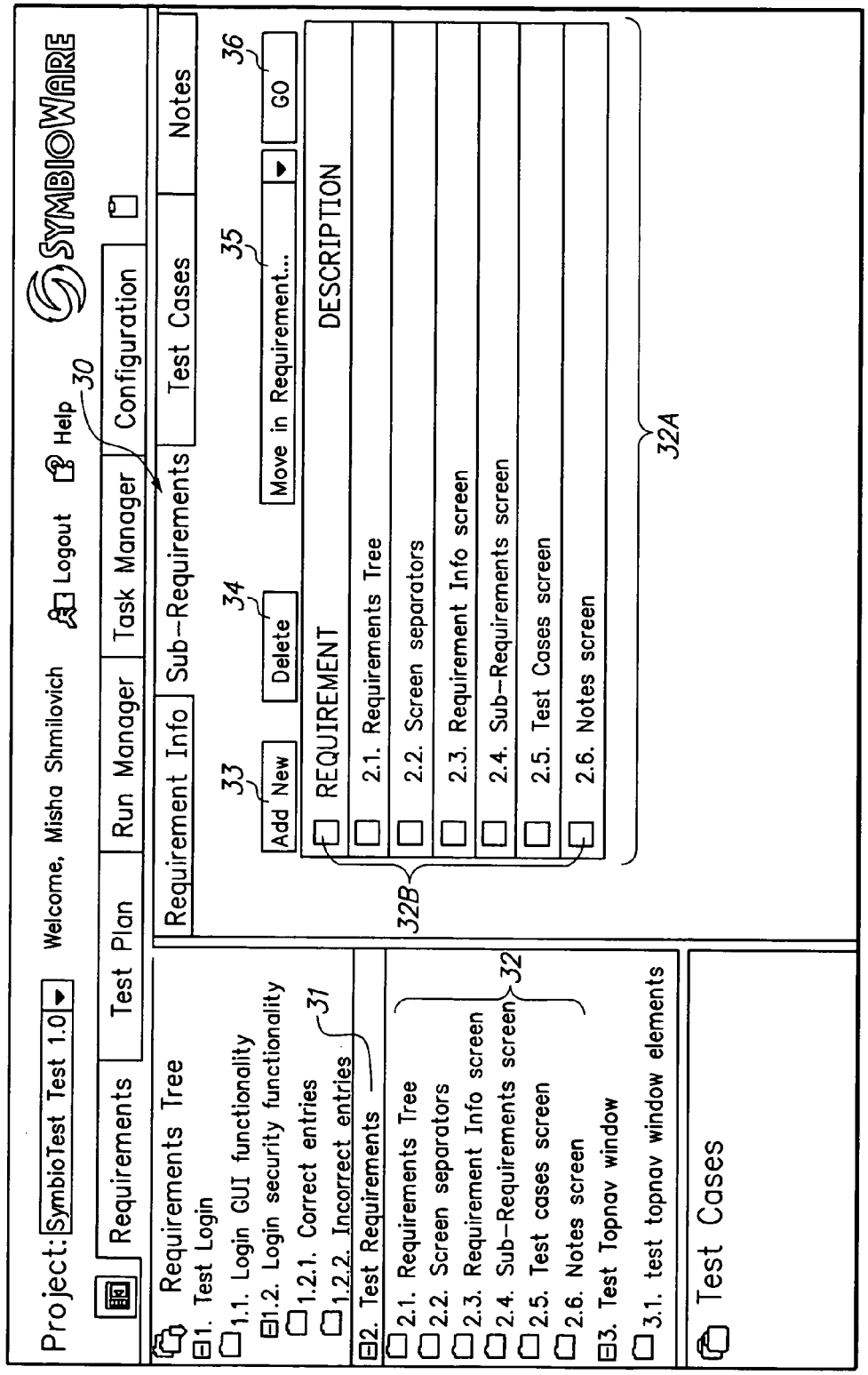
FIG. 3 is a screenshot of Requirements tab/Sub-Requirements sub-tab of the web-interactive interface which enables a user to navigate through a second organizational level of Sub-Requirement(s) included in within a Requirement.

Sub-Requirements can be similarly manipulated as shown by selecting the Sub-Requirements sub-tab 30 of FIG. 3. If a user where to click on any one Requirement, such as depicted by highlighted Requirement "Test Requirement" 31, a user would be able to view the Sub-Requirements 32 contained therein. Sub-Requirements Table 32A provides similarly check-boxes 32B as Requirements Table 23 from FIG. 2, where a user can select from one or more Sub-Requirements by clicking on the provided check-boxes 32B, Add a new Sub-Requirement using Add New Button 33, delete a Sub-Requirement from the tree using Delete Button 34, or transplant one Sub-Requirement into another using pull-down menu 35 and then executing the transplant using Go Button 36.

Figure 4:
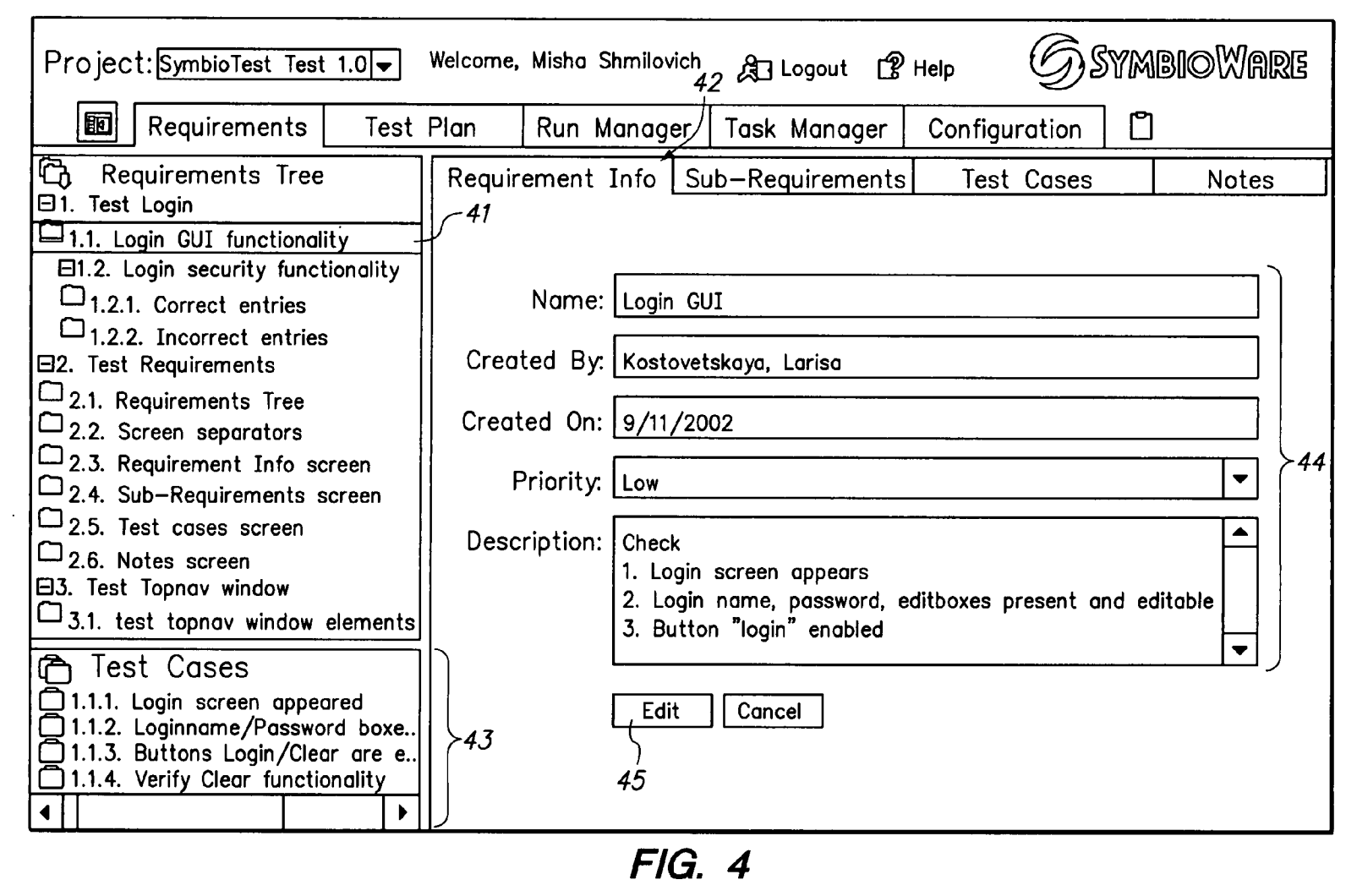

Turning now to FIG. 4, a user may click a Sub-Requirement to view its contents such as the highlighted Sub-Requirement "Login GUI functionality" 41. By clicking on the Requirements Info sub-tab 42, users may view information relating to the selected Sub-Requirement as shown in fields 44, and may edit the fields' contents using Edit Button 45. When a Sub-Requirement is highlighted, such as Sub-Requirement "Login GUI functionality" 41, a user may view all of the test cases included within the highlighted Sub-Requirement as shown in window 43. Furthermore, a user may click on the test case(s) themselves to view the steps and procedures that the automation tool would carry out as derived from the test case.

Figure 5:
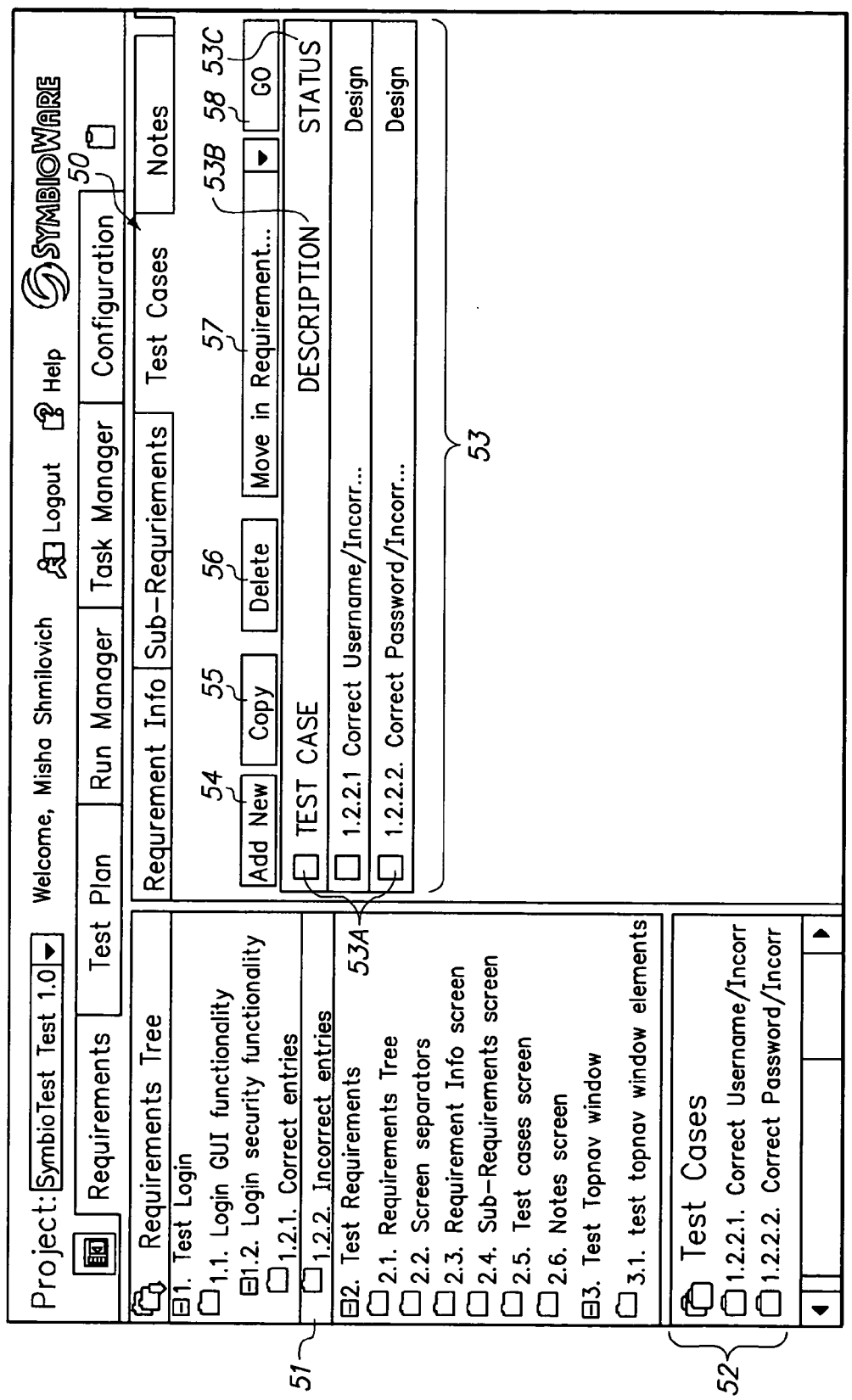
FIG. 5 is a screenshot of the Requirements tab/Test Cases sub-tab of the web-interactive interface which enables a user to view, copy, add, or delete a test case or move a test case between the Requirements/Sub-Requirements organizational levels.

Test cases can optionally be manipulated, as shown in FIG. 5, using Test Case sub-tab 50. A user may click on the Sub-Requirements containing the one or more test cases. For example, the Sub Requirement "Incorrect Entries" 51 is highlighted as shown and includes two test cases that are shown in window 52. A user may further manipulate the test cases using Test Case Table 53, which provides the user with click-boxes 53A to select from the available test cases, add a new test case (either an automated or manual test case, more infra) using Add Button 54, delete a checked test case using Delete Button 56, or transplant a selected test case into a Requirement or Sub-Requirement folder selected from pull-down menu 57 and pressing the Go Button 58. Additionally, users may clone one or more test cases that they may which to run under other Requirements or Sub-Requirements by selected the desired test case(s) and clicking the Copy Button 55. The test case replica may then be transplanted into a Requirement or Sub-Requirement using the features described above. Information about test case(s) can be viewed in "Description" column 53B and "Status" column 53C. Test case steps, which include actions, procedure, and expected results, can be added or modified using the Integrated Test Case Authoring Tool discussed infra.

Figure 6:
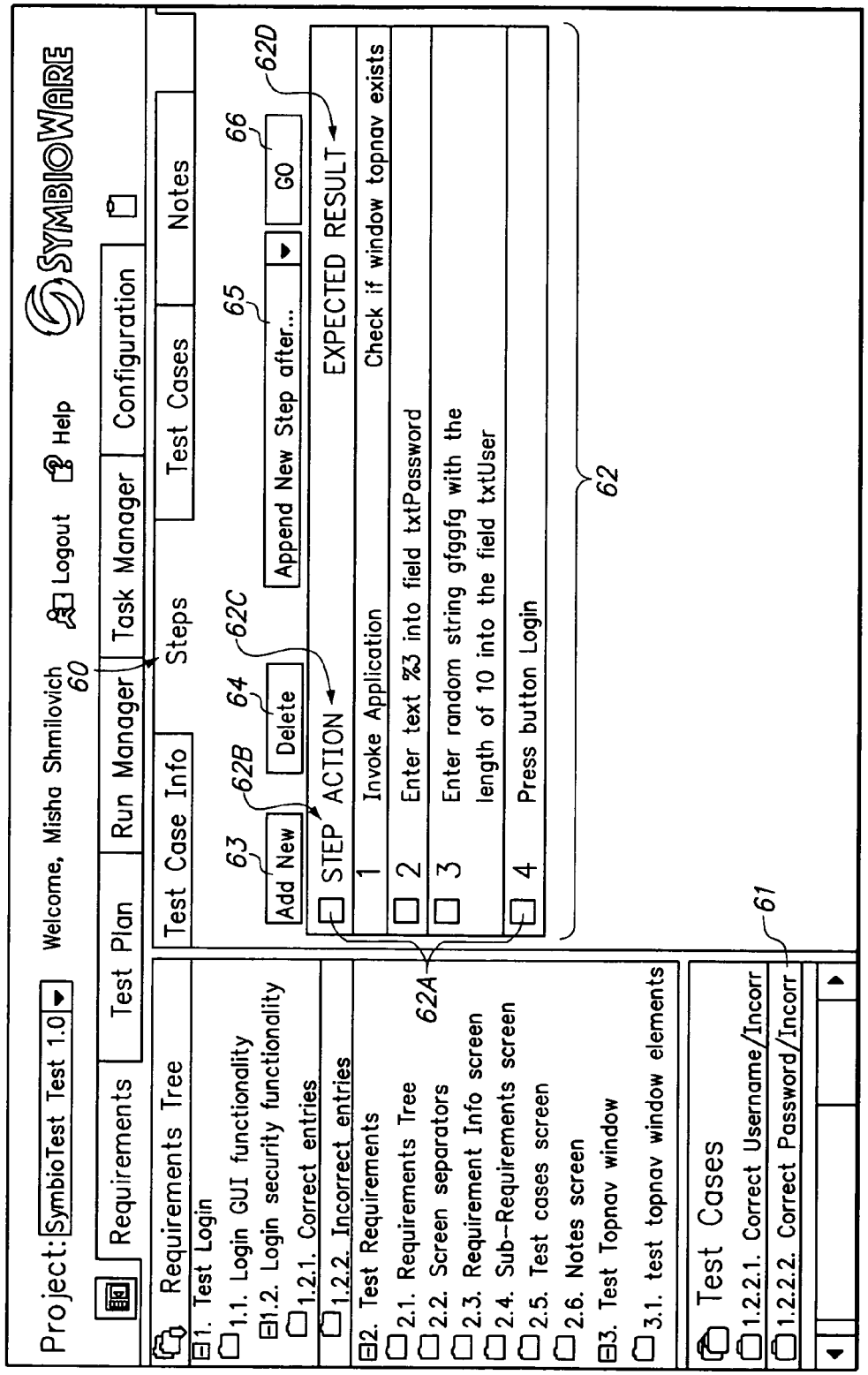
FIG. 6 is a screenshot of the Requirements tab/Steps sub-tab in which the steps (e.g., actions and their expected results) included in a test case are displayed. The web-interactive interface enables a user to view, move, or delete a step, or add new steps by way of the Integrated Test Case Authoring Tool.

At the most specific level of organization, user(s) may manipulate the steps and procedures of a test case as shown in FIG. 6. User(s) may click on the test case(s) they wish to manipulate, for example, Test Case 61 called "Correct password/Incorrect Username," located in the "Incorrect entries" Sub-Requirement of the "Test Login" Requirement. A table 62 shows the sequential steps 62B of the Test Case 61, the Action 62C performed at each step, and the Expected Result 62D of Action 62C being performed by the Automation tool on the Application being tested.

Clicking the corresponding check-box 62A and clicking the delete button 64 can delete one or more steps of the test case. New steps and procedures can be added by pressing Add New button 63 and using the Integrated Test Case Authoring Tool shown in FIGS. 15–18 (infra). The text of each step specifies an Action 62C using a character string recognizable by an automation tool, for example, the character strings "txtPassword" and "txtUser" as shown in the column Action 62C are character strings recognized by automation tool and indicate (GUI object) fields in the software application sought to be tested application) where a password and a user name can be entered, respectively. This text can be clicked on by a user and edited using the Integrated Test Case Authoring Tool. The skilled artisan will be able to modify the Integrated Test Case Authoring Tool to use the scripting language of any automation tool (e.g., WinRunner, SilkTest or Rational Robot) without undue experimentation. To prevent inconsistencies and to maintain test case integrity, a computer program code included in the application server (e.g., Active Server Page [ASP] scripting) regulates the permissions of test case(s) that is disallow the editing of a test case when it has been scheduled to run on a host machine or, conversely, to disallow scheduling while a test case is edited.

Figure 7:
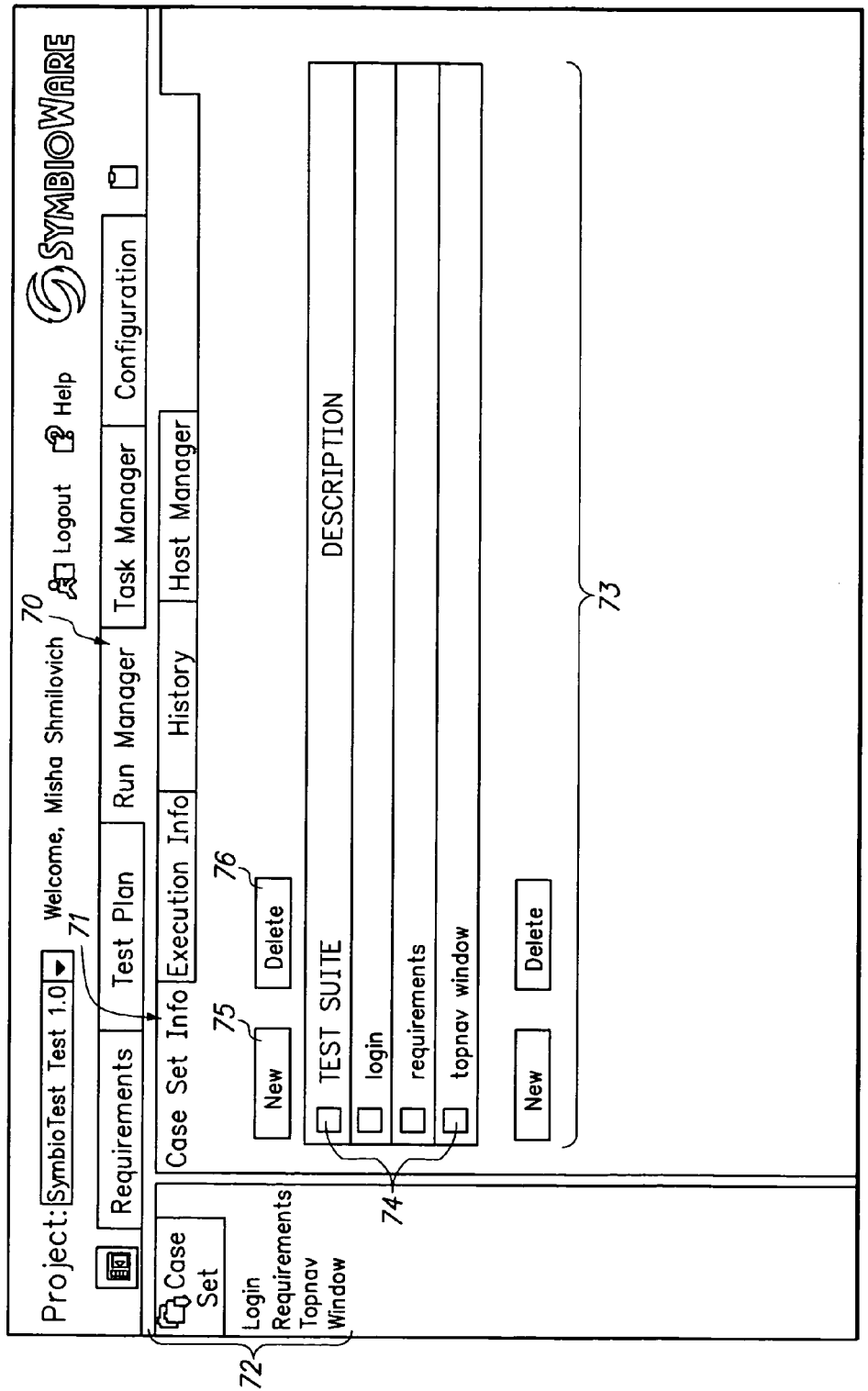
FIG. 7 is a screenshot of the Run Manager tab/Case Set Info sub-tab where web-interactive interface enables a user to view, add, or delete a case set.

In order to run a test case(s) on a host machine(s), a user may utilize the web-interface provided by the Run Manager tab 70 as shown in FIG. 7. Window 72 shows lists all available Case Sets. Case Sets comprise one or more test cases selectable from the Requirements and Sub-Requirements. Table 73 lists the Case Sets which can be selected using their corresponding check-boxes 74. Selected Case Sets can be deleted using the Delete Button 76 or a new Case Set can be created using the New Button 75.

Figure 11:
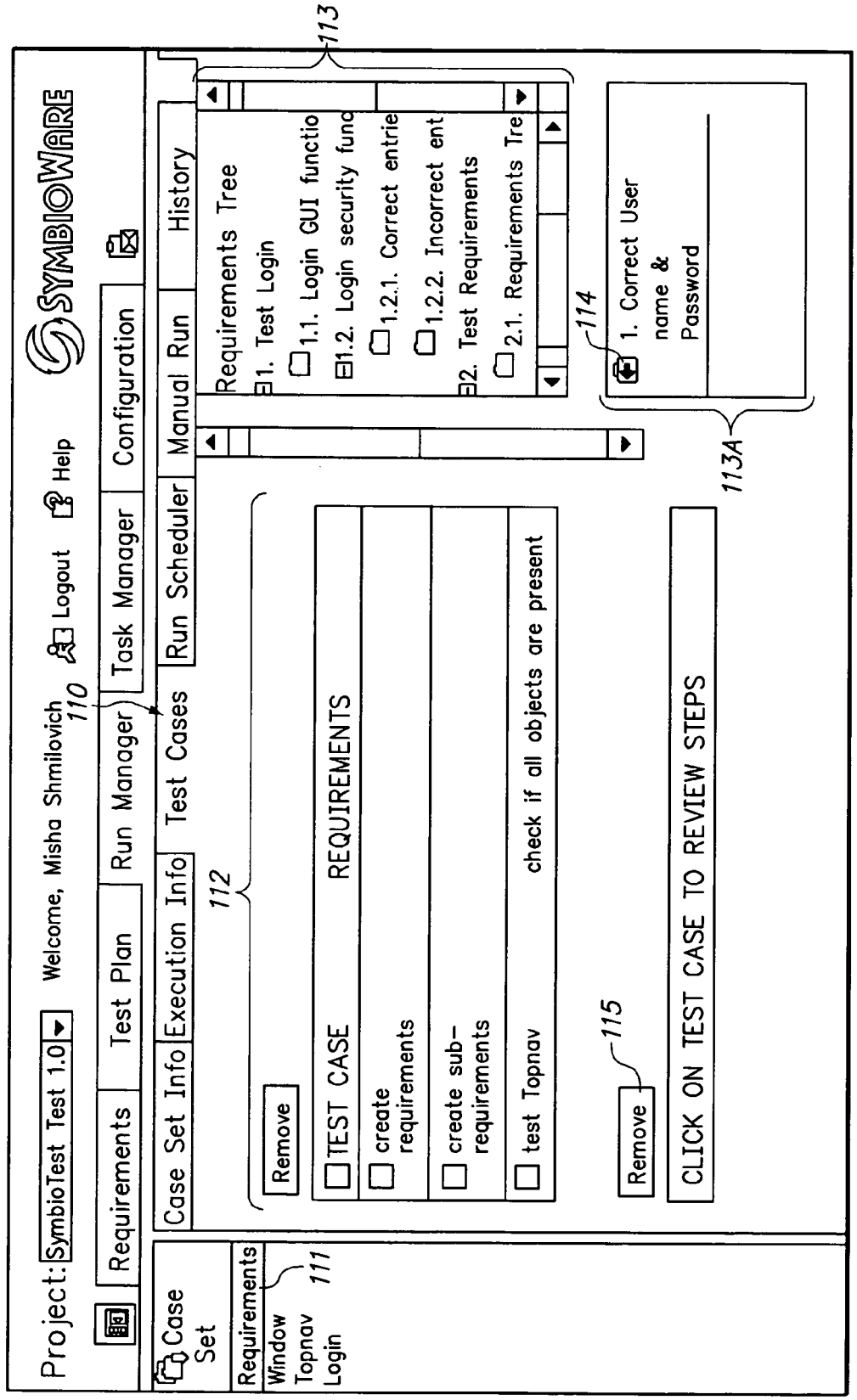
FIG. 11 is a screenshot of the Run Manager tab/Test Cases sub-tab of the web-interactive interface which appears when a case set is selected from the left frame and enables a user to add test case(s) to the case set.

Once a Case Set is created it is preferably filled with one or more test cases intended for execution. Turning now to FIG. 11, if the Case Set "Requirements" 111 is selected, it can be filled with one or more test cases selected from Requirements Tree 113. When a Requirement or Sub-Requirement is highlighted from Requirements Tree 113, any test case(s) included therein is displayed in the lower window 113A and are transferable into the selected Case Set. For example, in FIG. 11, the test case "Correct User Name & Password" is included in Sub-Requirement "1.2.1 Correct Entries" which is a Sub-Requirement included in "1.2 Login security function" which is in turn included in Requirement "Test Login." Case Sets can be filled by the selecting on transfer icon 114, which actuates the copying of a test case into the selected Case Set and the test case appears in Case Set table 112.

Figure 12:
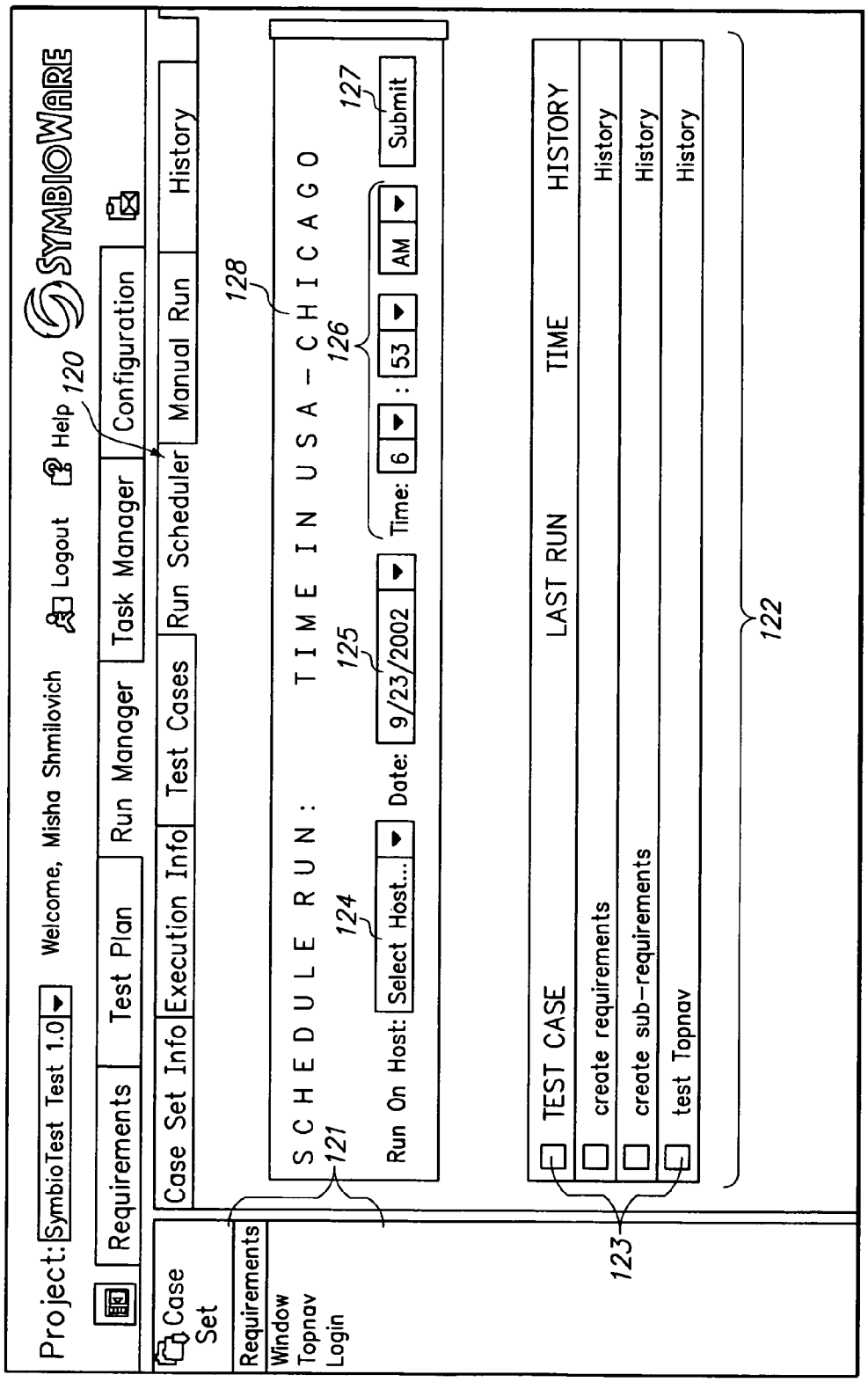
FIG. 12 is a screenshot of the Run Manager tab/Run Scheduler sub-tab where a user may schedule runs for one or more selected test cases, assign a date and time for the test case to run, and assign a host machine where the selected test case is to be run.

Turning now to FIG. 12, a user may schedule a test case for execution on a host machine using the Run Scheduler sub-tab 120. Choosing from the available Case Sets 121, a user is provided with a table 122 of the test cases included in the selected Case Set available for execution. By selecting one or more test cases using the check-boxes 123, a user may assign the test case to a host machine selected from pull-down menu 124 and the date and time when the test case is to run using pull-down menus 125 and 126, respectively. After a user has selected the desired parameters for test case execution they may click the Submit button 127 rendering the test case available to the host machine upon host machine query.

Turning now to the Host Manager sub-tab 100 as shown in FIG. 10, a Host Machine Table 101 is displayed that allows a user to add or remove host machines.

Turing now to the schema shown in FIG. 18, host machine 185 includes command manager 188 which is preferably computer readable code that reads in decoded/parsed files and can subsequently pipe them, if appropriate, into one of a suite of functions, scripts, executables, which are preferably DLL files. The functions can be, for example, an environment setup creator 189, a test case steps manager 1810, and a task query 1811 (more infra).

Communication between application server 180 and the automation tool included in host machine 185 can be achieved using a request/response network communication model, wherein, the Simple Object Access Protocol (SOAP) protocol is preferred. The benefits of SOAP are (a) HTTP communication; an RPC-like protocol that is simple, well known in the art and more likely to function in the face of firewalls than other protocols known in the art. HTTP requests are typically handled by web server software of application server 180, such as IIS and Apache, and (b) platform-neutral data representation protocol like XML.

There are numerous XML encoding and decoding software products available for every programming environment and platform.

In another embodiment, Remote Procedure Call (RPC) protocols could be used, for example, Sun RPC, DCE RPC, Object RPC (ORPC) protocols like DCOM and CORBA's Internet Inter-ORB Protocol (IIOP) or General Inter-ORB Protocol (GIOP), custom protocols like datagrams (text or binary message) exchange over network (HTTP, SMTP/POP, TCP/IP, named pipes and so on) also may used.

These communication protocols and data transmission means allow Application Server 180 to control and manage remotely automation tool setup testing environments, implementation and execution of testing, gathering information about the software application to be tested and to return the result of these operations.

A task query 1811 function (e.g., DLL file, executable script, callable script or computer program), can be called at any predetermined time interval by command manager 188 to query application server 180 if any test cases have been scheduled to be run on host machine 185. A query can be sent by generating a query file including the query string by host encoder 186. Preferably this query file takes the form of a flat file or XML file or any other format known in the art capable of transmitting a query instruction (e.g., HTTP or HTTPS request). It will be appreciated by the skilled artisan that any callable script or computer program can be written using only due experimentation to facilitate this query function.

If the query returns a response from application server 180 that a test case has been assigned and scheduled to host machine 185, task query 1811 transmits a "send" request to application server 180 which actuates the transmission of one or more files associated with the assigned and scheduled test case. The "send" instruction can also be generated by host encoder 186 and take the form of an XML file, flat file, or any other file capable of transmitting a send instruction. The send initiates a gathering of information about the assigned and scheduled test case from database 181 coupled to application server 180. Information gathered from database 181 is aggregated and one or more files are generated from the gathered information by server encoder 184. Application server 180 can communicate with, gather data from and input data into coupled database 181 and further populate the web-interface with from database 181 using a variety of methods known in the art including without limitation to SQL (e.g., Sybase, Oracle, or Microsoft SQL) or any other relational database query language, cgi scripting, PERL scripting and, JAVA, and Javascript.

A test case file preferably includes the steps (actions, procedures, and expected results) of the test case to be executed and the name of an automation tool GUI environment file(s) associated with the application testing project. The one or more test case files can take the form of an XML file, flat file, or other file (e.g., HTML, SGML (Standard Generalized Markup Language), XHTML (Extensible HyperText Markup Language) capable of transmitting information suitable for parsing by host decoder 187.

Once a file associated with a test case has been received by host machine 185, host decoder 187 reads the file and parses out information for the execution of the test case, for example, the name of the automation tool GUI environment file(s) associated with the project, the test case steps and their dependencies, and execution sequences used by the automation tool. The name of the automation tool GUI environment file(s) is read by environment setup creator 189 which then sends a request to the application server 180 to send and a copy of that automation tool GUI environment file stored by application server 180 to host machine 185. Environment setup creator 189, upon receipt of the automation tool GUI environment file by host machine 185, loads the automation tool GUI environment file into the automation tool.

The automation tool GUI environment file(s) (e.g., a ".gui" file recognized by the WinRunner automation tool, or a ".inc" file recognized by the SilkTest automation tool) contain the description (e.g., type, name, size, position or location on the screen, and default setting) of any GUI objects (e.g., radio-boxes, check-boxes, buttons, pull-down menus, hyperlinks) as well as any calls and properties of the objects the test case will be testing.

Both WinRunner and SilkTest automation tools use a "lookup table" mechanism to isolate the variable name used to reference a GUI object in a test script from the description used by the operating system to access that object at runtime. SilkTest normally places an application's GUI declarations in a test frame file (a ".inc" file). There is generally one GUI declaration for each window and each object in a window. A GUI declaration consists of an object identifier—the variable used in a test script—and its class and object tag definition used by the operating system to access that object at runtime. SilkTest provides the following capabilities to define an object tag: (1) a string, which can include wildcards; (2) an array reference which resolves to a string which can include wildcards; (3) a function or method call that returns a string, which can include wildcards, (4) an object class and class relative index number; and (5) multiple tags each optionally conditioned with (6) an OS/GUI/browser specifier. WinRunner normally places an application's logical name/physical descriptor definitions in a GUI Map file (the ".gui" file). There is generally one logical name/physical descriptor definition for each window and each object in a window. The logical name is used to reference the object in a test script, while the physical descriptor is used by the operating system to access that object at runtime. WinRunner provides the following capabilities to define a physical descriptor: (1) a variable number of comma-delimited strings that can include wildcards, where each string identifies one property of the object. The notion behind this lookup table mechanism is to permit changes to an object tag (SilkTest), or a physical descriptor (WinRunner) definition without the need to change the associated identifier (SilkTest) or logical name (WinRunner) used in the test case. In general the object tag (SilkTest) or physical descriptor (WinRunner) resolve to one or more property definitions that uniquely identify the object in the context of its enclosing parent window at runtime. It is also possible with both automation tools to dynamically construct and use object tags (SilkTest) or physical descriptors (WinRunner) at runtime to reference objects in test scripts.

The automation tool GUI environment file(s) is used along with the automation tool readable test script generated by host decoder 187 by parsing test case steps from the test case associated file sent to host machine 185 by application server 180. Examples of shareware XML parsing scripts are those available from Mozilla (http://www.mozilla.org/rdf/doc/xml.html/ns/modules/xml/expat), and the associated APIs at expat/xmlparse/xmlparse.h and the glue code available at ns/modules/xml/glue/. The automation tool then reads both the automation tool GUI environment file(s) and test script and executes the script.

Figure 8:
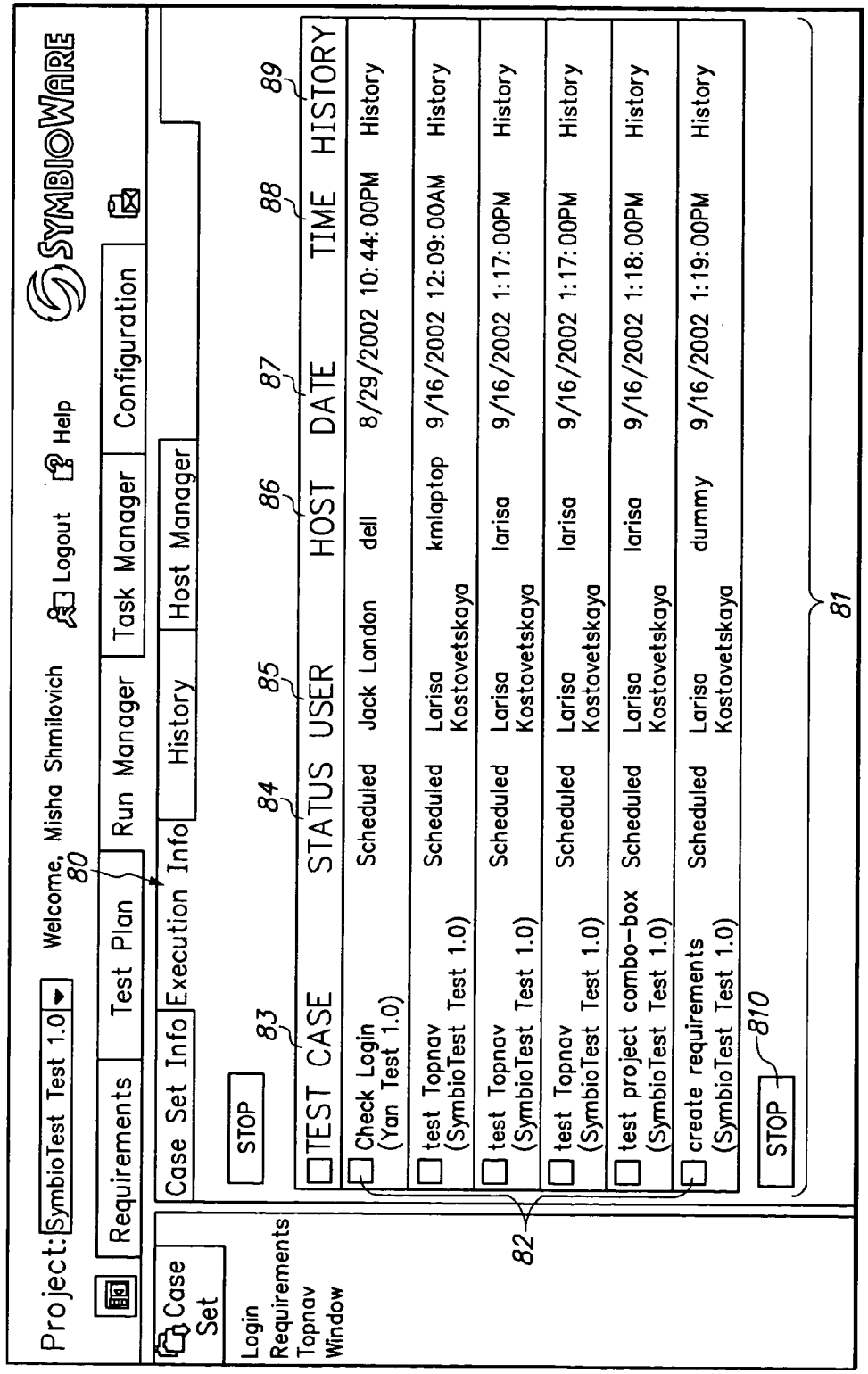
FIG. 8 is a screenshot of the Run Manager tab/Execution Info sub-tab of the web-interactive interface which enables a user to view the status (e.g., scheduled, sent to host, running, failed, passed, or stopped) of one or more test cases scheduled to run on a particular host machine at a designated time.

Now turning to FIG. 8, the Execution Info sub-tab 80 under the Run Manager tab 70 (FIG. 7) shows displays an Execution Information Table 81 wherein a user can monitor the Status 84 of a scheduled Test Case 83. The column Status 84 can indicate that a test case has been scheduled (Date 87, Time 88) scheduled, sent to host, running, failed, passed, or stopped. Additionally, the web interface permits users to monitor the status of each step of each test case by clicking, for example, on an expandable list button (not shown) showing a list of the test case steps, their execution times and current status.

The User Column 85 indicates which user submitted the test case for execution to which Host machine 86. This feature permits one or more users on the system to monitor each other's activities thus better dividing up the testing work load, keeping each user informed of the Project's progress, increasing testing efficiency, and aiding in subsequent testing strategies since all necessary information is centrally provided through the web-interface. As with the previously described features, one or more Test Cases 83 can be selected using check-boxes 82, and the execution of the selected Test Cases 83 can be stopped using the Stop Button 810; assuming a user has sufficient access to do so. The History column 89 allows the user to click on any of the bolded History hyperlinks and be taken to the History sub-tab 90 view as shown in FIG. 9.

Figure 13:
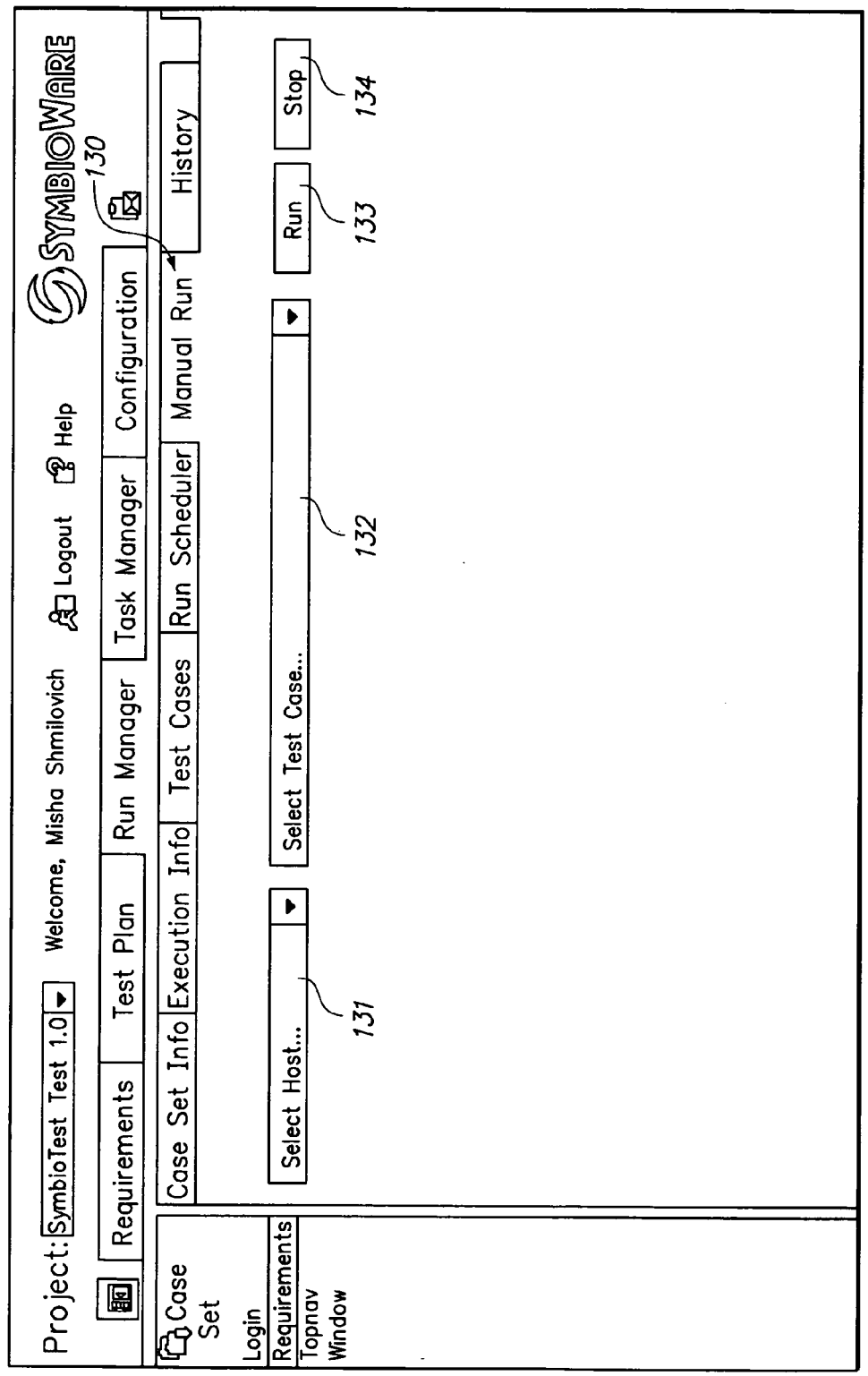
FIG. 13 is a screenshot of Run Manager tab/Manual Run sub-tab in which a user may execute an immediate run of a selected test case on a selected host machine.

Optionally, a user may submit a test case for immediate execution as shown in FIG. 13 using the Manual Run sub-tab 130 by selecting the test case to be run from pull-down menu 132 and selecting the host machine where the test is to be run from pull-down menu 131 and clicking on Run Button 133 or terminating a test case run with Stop Button 134.

Figure 9:
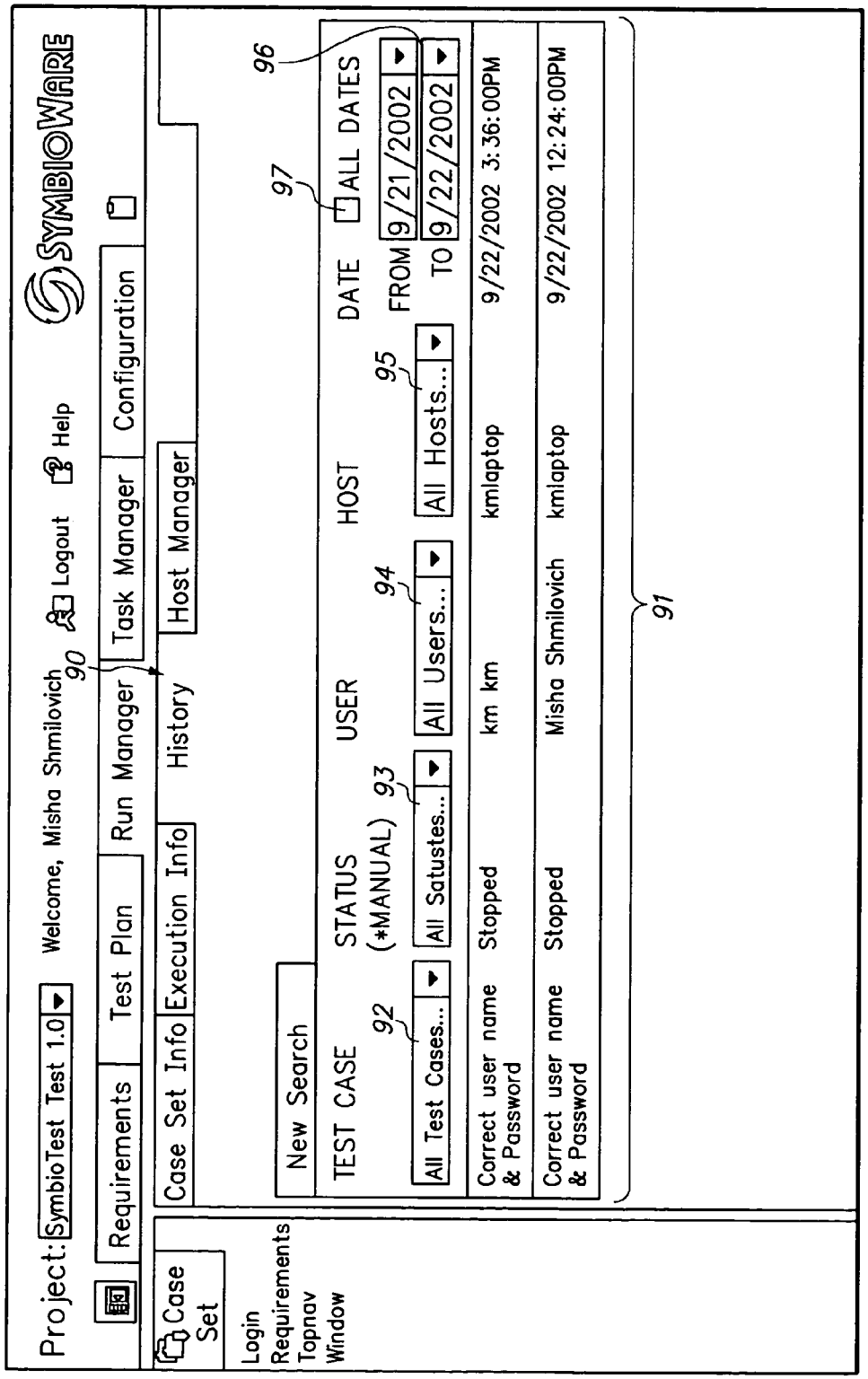
FIG. 9 is a screenshot of the Run Manager tab/History sub-tab of the web-interactive interface which enables a user to view the histories of test case runs by sorting fields by test cases, status, the user submitting the run, host machines, or run dates and times.

The History sub-tab 90 displays a page, as shown in FIG. 9, that allows a user to search through the histories of test case execution and sort the views by Test Case 92, by Status 93, by the user who submitted the test case for execution 94, by Host 95, or by date or date range 96 or all dates 97.

Figure 18:
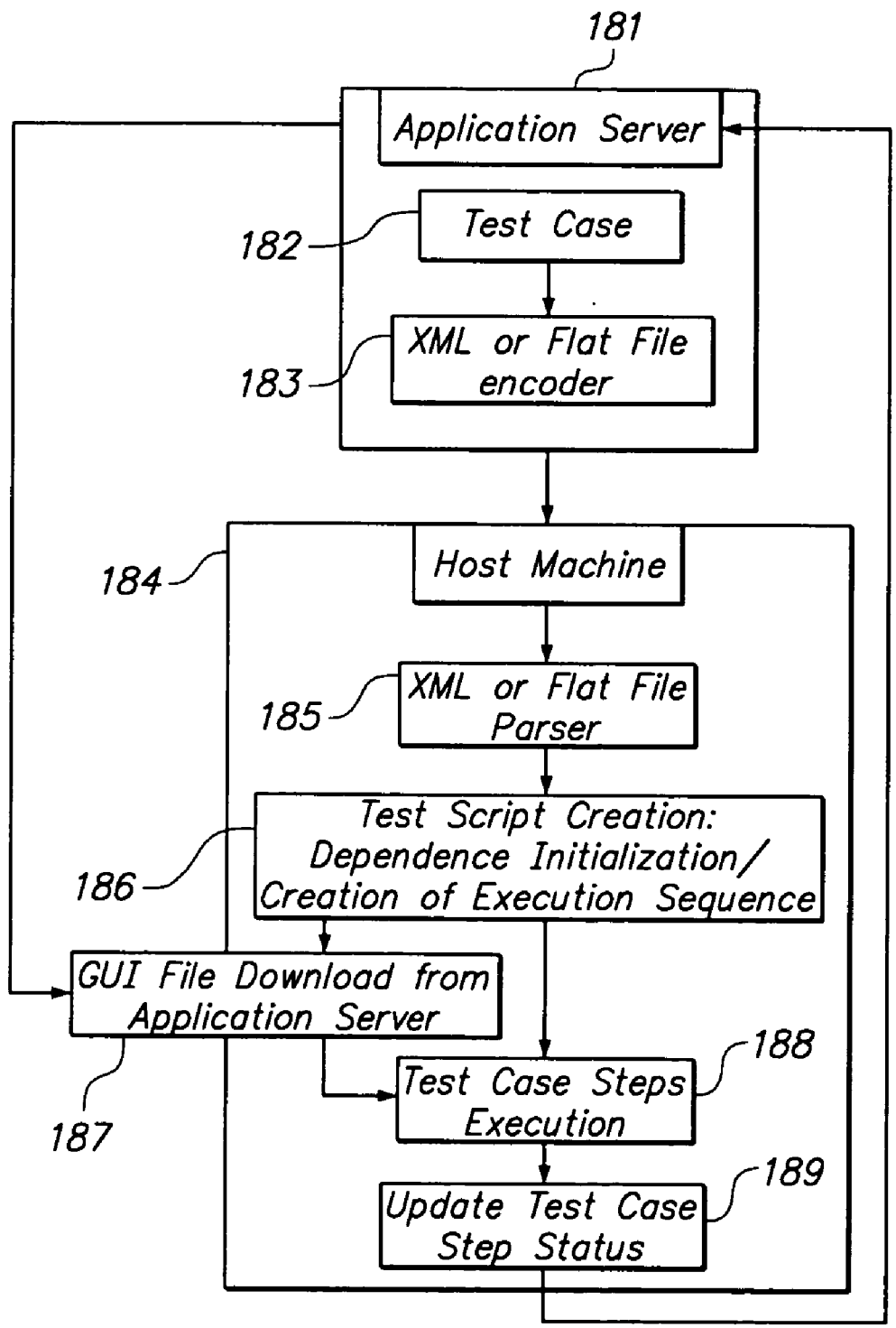
FIG. 18 is a schematic representation of an algorithm employed by the invention to relay the test case associated files to the host machine, use those files to generate test scripts recognizable by an automation tool loaded on the host machine, download the appropriate automation tool GUI environment file(s) for the project, run the test script using the automation tool, and relay the status of the run back to the application server.

The application server 180 can update the web interface with status information provided by host machine 185, as shown in FIG. 18, with current status information regarding an executed test case or step at any predetermined time interval. The application server 180 can achieve such a status refresh using a JavaScript, Java, ASP, JSP6, C#, J#, VB.NET, ASP NET or CGI based program that query the host machine and obtain current information about the status of one or more test cases and/or their included steps submitted for execution. Alternatively, the host machine 185 can contain a callable function like test case step manager 1810 as part of command manager 188 which sends a host encoder 186 generated file containing status information to application server 180, which file is parsed by server decoder 183 and the information therefrom piped to the web interface for display to one or more users.

Figure 20:
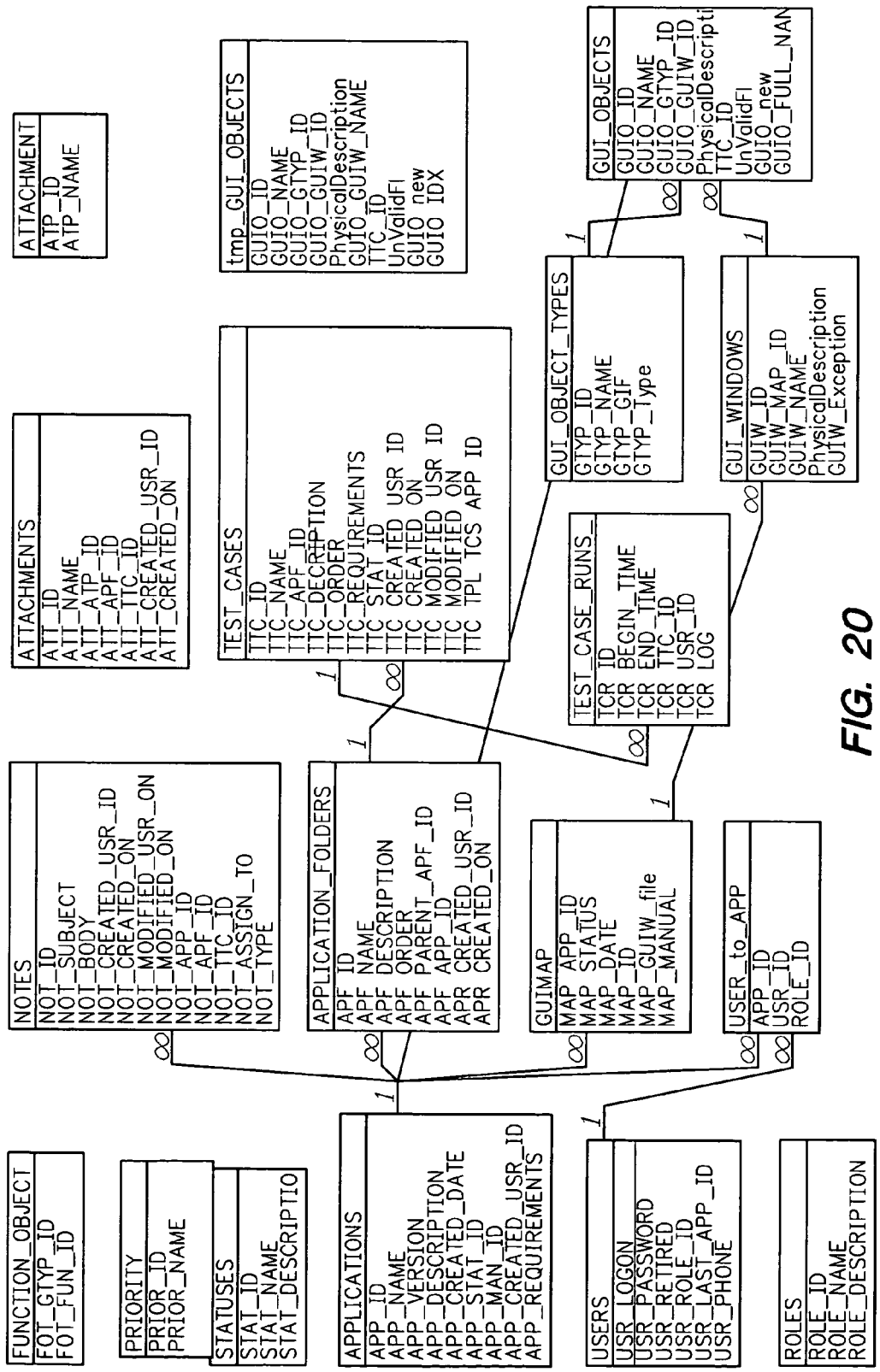
FIG. 20 is a schema of the relational database utilized by the application server.

Application server 180 and a coupled database 181 (which could be housed on a separate computer or on the same computer as application server 180) includes data and information used to populate the fields of the application server and provided logical links to one or more files associated with a test case and test plan (e.g., automation tool GUI environment files, Test Plan files, Attachment files). For example, the database coupled to the application server can be a relational database as shown in FIG. 20 and can include, for example, tables such as those in Table 1:

TABLE 1

Relational Database

| TABLE NAME | CONTENTS |
|---|---|
| FUNCTION_OBJECT | Links between automation functions and predefined objects |
| PRIORITY | List of priorities |
| STATUSES | List of stages of objects using |
| APPLICATIONS | Information relating to project(s) |
| USERS | Information relating to user(s), their login name, password, phone number |
| USER_TO_APP | Information relating to user role in project(s) |
| ROLES | List of users roles |
| NOTES | Notes (task, questions.) and information relating to notes (created date, author, theme). |
| APPLICATION_FOLDERS | Information relating to requirement(s) |
| GUIMAP | Information relating to automation tool GUI environment file(s) |
| GUI_OBJECT_TYPES | List of predefined objects |
| GUI_WINDOWS | Information relating to window(s) in current GUI_MAP, name, physical description |
| GUI_OBJECTS | Information relating to object(s) in current GUI_MAP, name, physical description, parent window |
| tmp_GUI_OBJECTS | Information relating to object(s) in GUI_MAP, name, physical description, parent window |
| TEST_CASES | Information relating to test case(s) |

Integrated Test Case Authoring Tool

The computer system including the application server that provides user(s) with web-interactive interface to the user also provides a web-based GUI interface for use in authoring test cases. The steps and procedures encoded into the test cases utilize terminology, text strings, and/or nomenclature native to an automation tool so that the steps and procedures can be easily converted into an automation tool recognized test script upon parsing.

Automation tools provide proprietary, interpreted, scripting languages that control constructs, arithmetic and logical operators, and a variety of built-in library functions to perform such activities such as string manipulation, regular expression support, or standard input and output, etc.

SilkTest, for example, provides a strongly typed, object-oriented programming language called "4Test." Variables and constants in 4Test may be one of 19 built-in data types, along with a user defined record data type. 4Test supports single- and multi-dimensional dynamic arrays and lists, which can be initialized statically or dynamically.

WinRunner provides a non-typed, C-like procedural programming language called "TSL." Variables and constants are either numbers or strings. TSL supports sparsely populated associative single- and pseudo multi-dimension arrays, which can be initialized statically or dynamically—element access is always done using string references—foobar["1"] and foobar[1] access the same element.

A user with no scripting experience, relying only on the web-interactive interface provided by the computer system can generate test cases by clicking on GUI objects and entering test strings into appropriate fields that require user input. Furthermore, users can generate test cases using a combination of manual and GUI controlled step and procedure addition.

Figure 14:
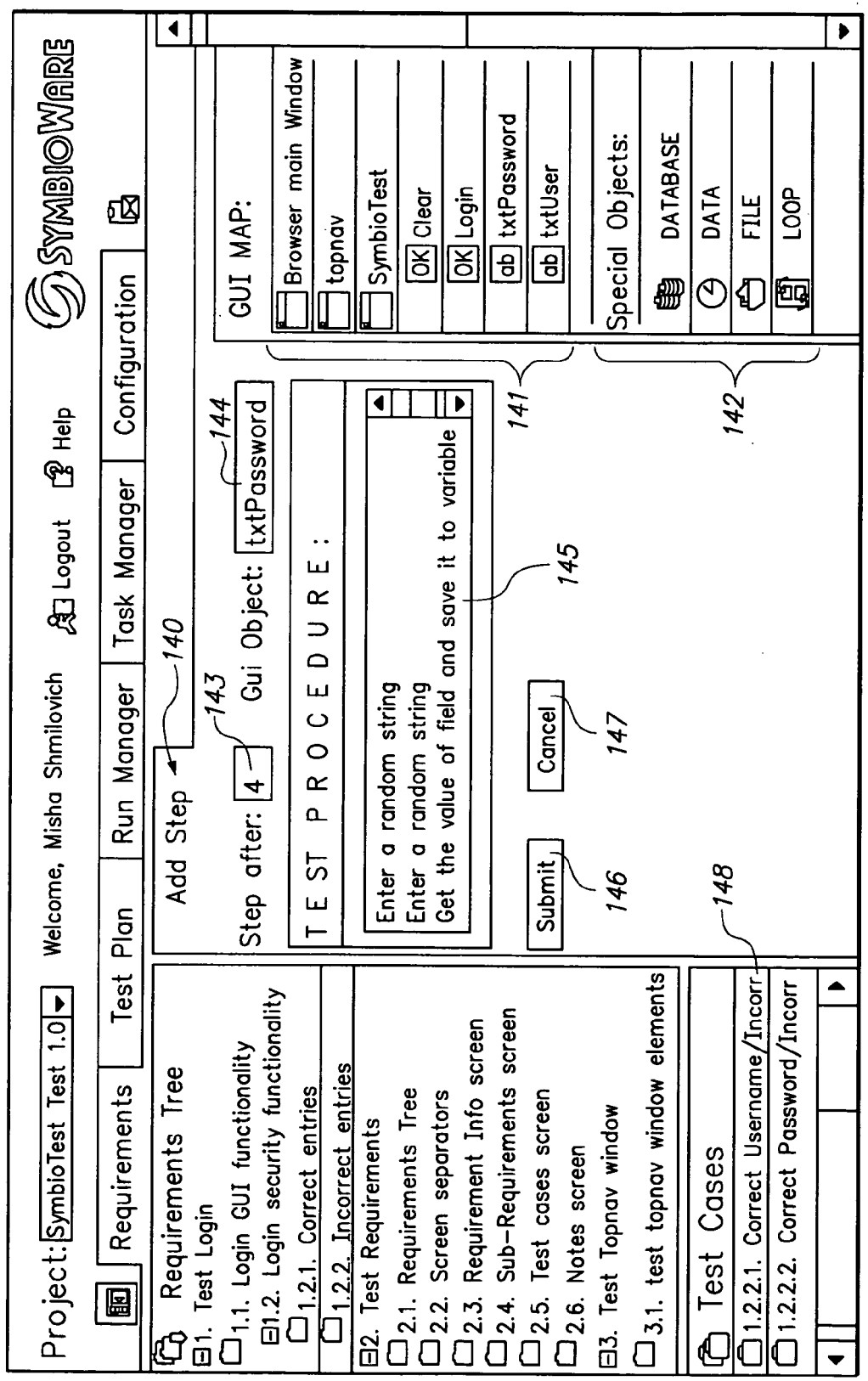
FIG. 14 is a screenshot of a web-interactive interface for an Integrated Test Case Authoring Tool which enables a user to design new test cases or modify existing test cases by selecting and adding steps and by manipulating the testing procedures within the steps from a list of GUI objects and modules.
Figure 15:
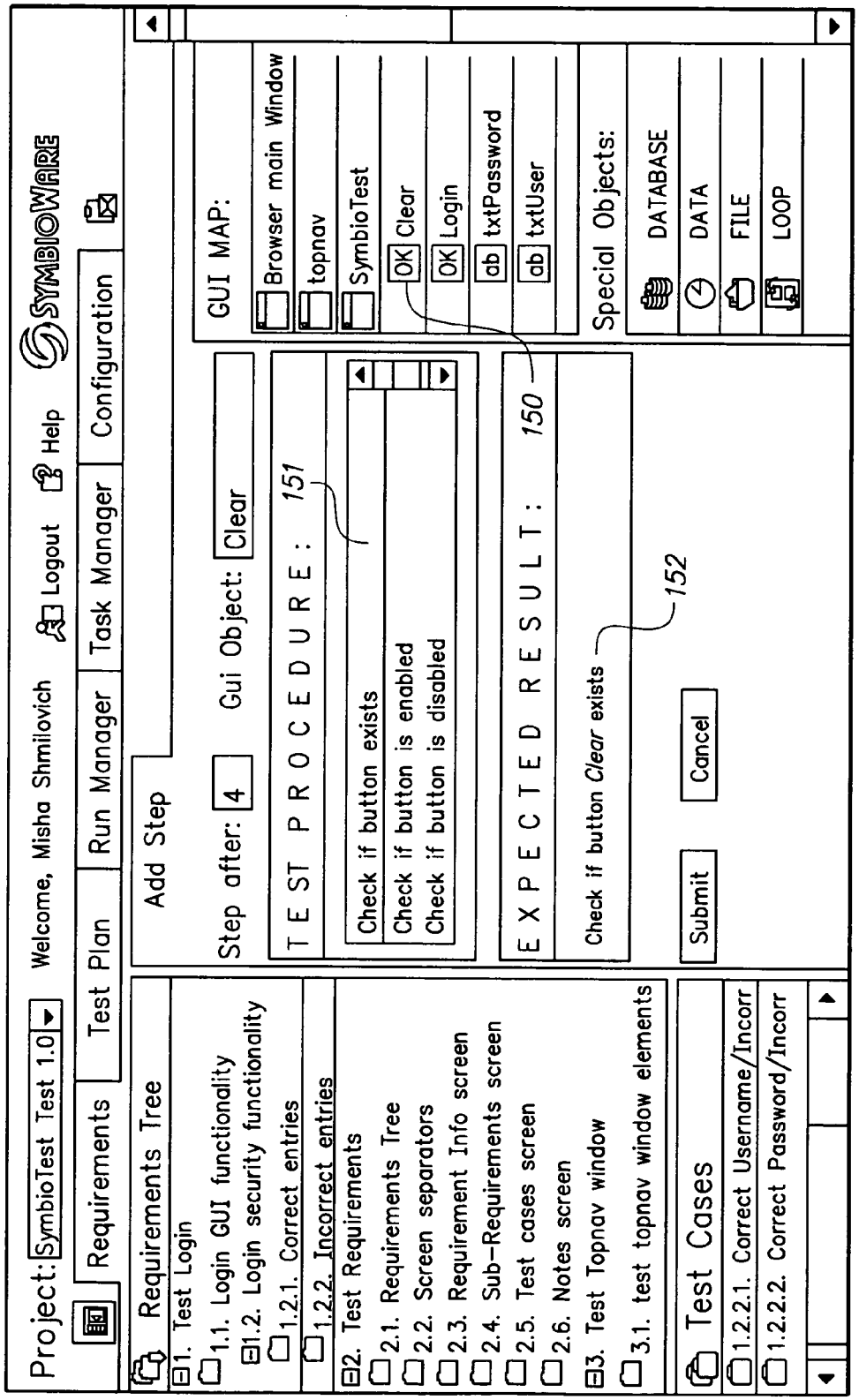
FIG. 15 is a screenshot of the web-interactive interface for an Integrated Test Case Authoring Tool which enables a user to include a step in a new or existing test case that checks the status (e.g., the existence) of an object.

Turning to FIG. 6, user(s) may click on either the Add New Button 63, thus creating a new step in the selected test case, or on the bolded-hyperlinked text of a test case step to modify that step. Users may append steps to existing steps and procedures of a test case or may modify existing steps using the Integrated Test Case Authoring Tool interface as shown in FIG. 14. This feature of the invention provides users with the option to choose from a plurality of preset GUI objects 141, each having embedded modules and procedures. Users may also choose from a plurality of preset "Special Objects" 142 (e.g., objects that do not map to a GUI objects), for example, a database object, a date object, a file object, or a loop object. Additionally, users may still create "manual" test cases (as opposed to "automated" test cases which utilize the plurality of preset GUI objects) despite the absence of an automation tool. Users may click on the "Manual Step" Special object icon and enter any text in customized action and customized expected result fields (not shown). Test cases created as "manual" test cases; which may include "Manual Step" Special object as appended using the Integrated Test Case Authoring Tool; cannot be executed using in an automated fashion by generating a test script and executing the test script using an automation tool. Manual test cases can be manually executed.

Both WinRunner and SilkTest automation tools, for example, support the use of class mapping (e.g., mapping a custom class to a standard class with like functionality) along with a variety of X:Y pixel coordinate clicking techniques to handle bitmap objects, as well as the use of external DLL functions to assist in object identification and verification. Beyond these shared features each automation tool has the following unique custom capabilities: (a) SilkTest has a feature to overlay a logical grid of X rows by Y columns on a graphic that has evenly spaced "hot spots" this grid definition is then used to define logical GUI declarations for each hot spot. These X:Y row/column coordinates are resolution independent (e.g., the logical reference says "give me $4^{th}$ column thing in the $2^{nd}$ row", where that grid expands or contracts depending on screen resolution), (b) WinRunner has a built-in text recognition engine which works with most standard fonts. This capability can often be used to extract visible text from custom objects, position the cursor over a custom object, etc. This engine can also be taught non-standard font types.

Upon selecting a GUI object whose functionality is sought to be tested and including in the step the action, procedure, and expected result associated with that GUI object, the object information appears on the web-interface. For example, FIG. 14 shows that the test case "Correct Username/Incorrect Password" 148 is selected for modification, and that the user has chosen to append a step after step 4 as shown in field 143. The GUI object chosen for this step is the "txtPassword" object (the standard syntax used by an automation tool to indicate a password text entry field) as indicated in field 144. Next, the user chooses from a list of preset testing procedures associated with the selected object provided in field 145. By clicking the Submit Button 146, a user adds the GUI object and any associated procedures to the test case, or may alternately cancel addition of the step by clicking the Cancel Button 147.

Figure 16:
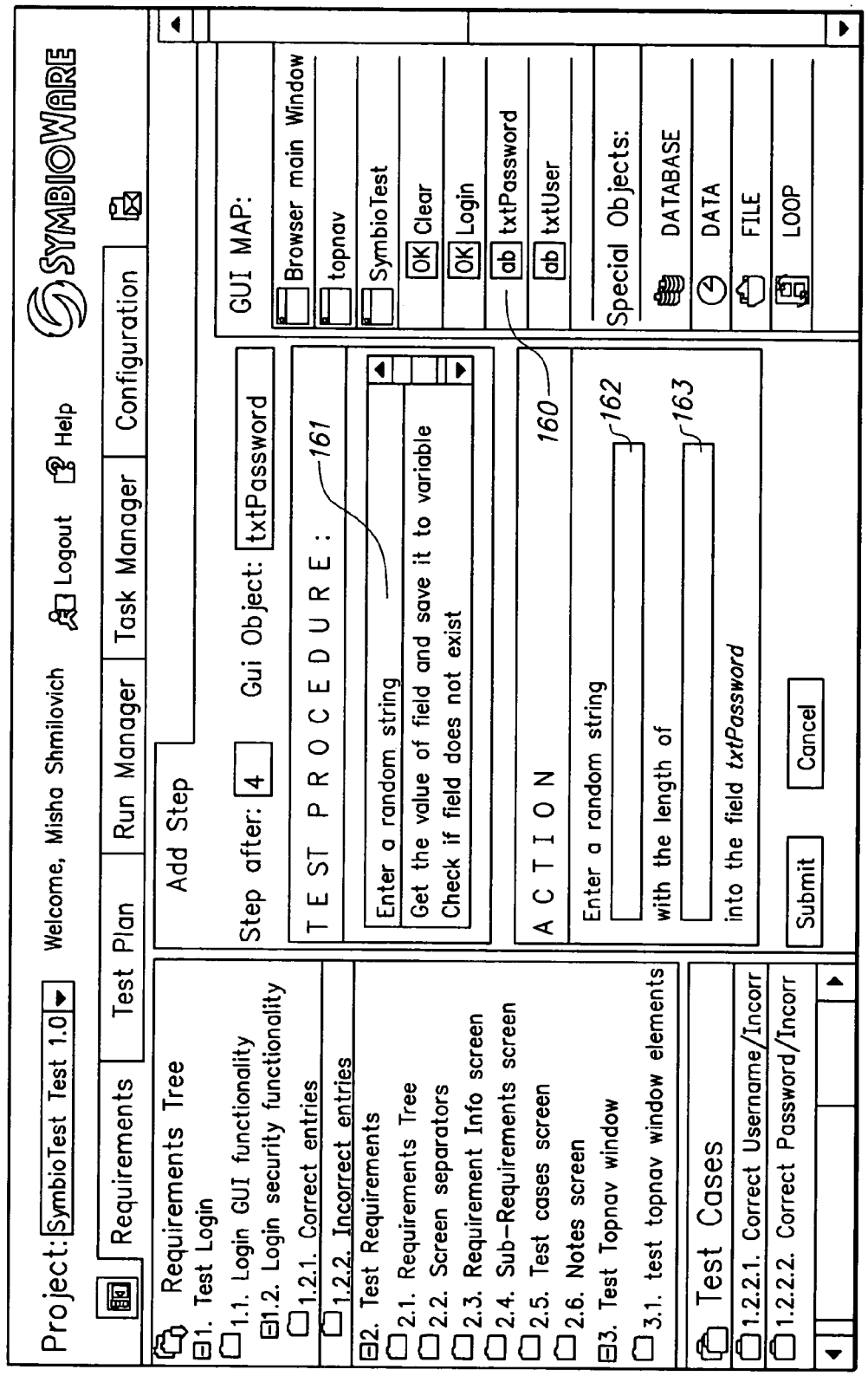
FIG. 16 is a screenshot of the web-interactive interface for an Integrated Test Case Authoring Tool which enables a user to include a step in a new or existing test case that actuates the entry of a character string into a designated field.

Procedures capable of being tested vary between automation tools and are known to persons having ordinary skill in the art. As in FIG. 15, for example, if a user selects the "Clear" object 150 for inclusion as a test case step, the user may then choose the procedure "Check if button exists" 151 for which the expected result 152 is a positive or negative response whether an object exists. These types of "check" procedures run without user interaction with the application. Alternatively, a user may append or modify a step to include an object and associate procedure in which invites user-application interface, for example, entering text into a field, as shown in FIG. 16. Here, the GUI object "txtPassword" 160 is selected to be an included step in test case "Correct Username/Incorrect Password" 148 (FIG. 14). A user may then select a procedure, for example, the "Enter a random string" 161 procedure providing the user with field 162 for entering one or more keystrokes (e.g., single character or character string in any language, number, floating number, decimal, symbol(s), or a combination thereof) and field 163 for specifying an integer value for the length of the character string.

Figure 17:
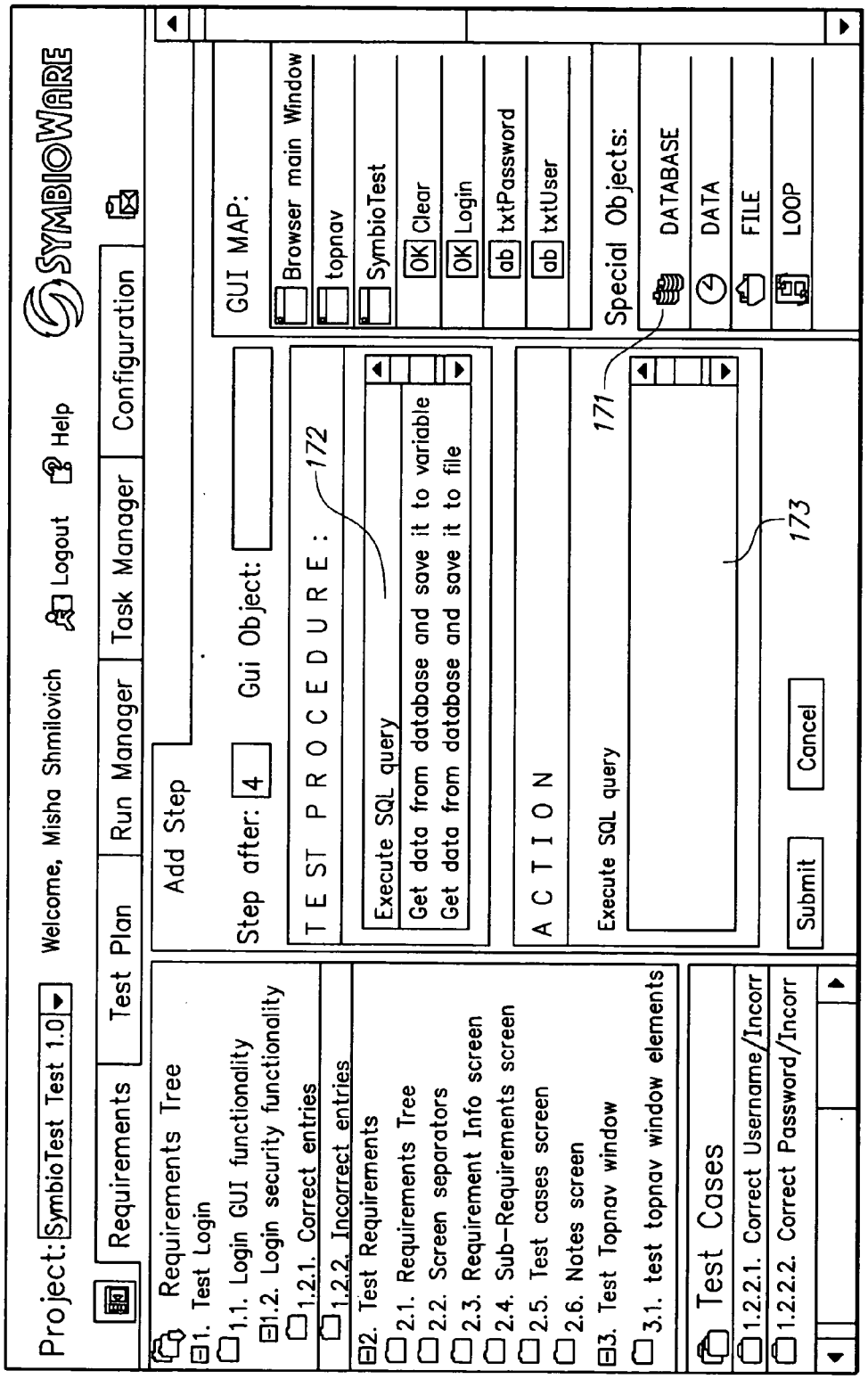
FIG. 17 is a screenshot of the web-interactive interface for the Integrated Test Case Authoring Tool which enables a user to include a step in a new or existing test case derived from a Special Object.

The Integrated Test Case Authoring Tool further provides a user with the ability to choose from a list of Special Objects for inclusion as steps in a test case. For example, FIG. 17 shows the selection of the Special Object "Database" 171 and its associated procedure "Execute SQL query" 172, for which a user may specify an SQL query 173. This and other Special Objects will be apparent to the skilled artisan and can be adjusted to suit the specific automation tool performing the test and similarly included in the web-interface for GUI base user authoring without undue experimentation.

The references cited above are all incorporated by reference herein in their entirety, whether specifically incorporated or not.

Exemplary embodiments of the invention have been discussed in detail above. While specific embodiments are discussed, it should be understood that this is done for illustrative purposes only. The skilled artisan will recognize that other components, configurations, or combinations can be used without parting from the spirit and scope of the invention. Thus, the breadth and scope of the present invention is defined in accordance with the appended claims and their equivalents.

We claim:

1. A method of web-interface mediated testing of the functionality of a graphical user interface (GUI) object comprising:
   (a) selecting an XML encoded test case for execution on a host machine using a web-interface provided by an application server, wherein said test case comprises one or more GUI object test steps;
   (b) selecting the host machine on which to run said test case using said web-interface provided by said application server, said host machine comprising an automation tool and a whole or partial copy of the computer readable code of the software GUI object being tested;
   (c) encoding a test case file comprising the one or more GUI object test steps of said selected test case and the name of an automation tool GUI environment file;
   (d) transmitting said. XML encoded test case file from said application server to said selected host machine;
   (e) receiving said XML encoded test case file;
   (f) decoding said XML encoded test case file;
      wherein said decoding comprises generating a test script by parsing GUI object functionality syntax recognized by said automation tool from said XML encoded test case file;
   (g) receiving a copy of the automation tool GUI environment file;
   (h) loading said test script, said automation tool GUI environment file, and said whole or partial copy of the computer readable code of the GUI being tested into said automation too;
   (i) executing said loaded, test script using said automation tool; and
   (j) storing a result in a database, thereby testing the functionality of said GUI.

2. The method according to claim 1 further comprising scheduling the execution of said selected test case on said selected host machine, wherein said scheduling comprises a time and a date for executing said selected test case on said selected host machine.

3. The method according to claim claim 1 further comprising a querying of the application server by the host machine whether a test case has been assigned to the host machine.

4. The method according to claim 3 further comprising said host machine requesting from the application server the encoding and transmitting of a test case file based on the test case assigned to said host machine.

5. The method according to claim 1 further comprising authoring a test case using said web interface and encoding said test case into XML format, wherein said authoring comprises adding GUI object functionality steps or modifying existing GUI object functionality steps by selecting from a plurality of GUI objects representing GUI object functionalities.

6. The method according to claim 5 wherein said GUI object functionalities are selected from a group consisting essentially of an action, procedure, and expected result.

7. The method according to claim 5 wherein said GUI objects are manually created and an action, procedure, or expected result corresponding to said manually created GUI object is entered using automation tool recognized syntax.

8. A method of claim 1 further comprising:
   (a) providing a web interface wherein one or more users can create one or more requirements folders using said web interface and saving said one or more requirements folders in a relational database coupled to an application server that provides said web interface,
   (b) providing a web interface wherein one or more users can create one or more test cases using a web interactive authoring tool and saving said one or more test cases in a relational database coupled to an application server that provides said web interface, wherein said test cases comprise one or more GUI object test steps, and
   (c) providing a web interface wherein one or more users can sort said one or more test cases within said one or more requirements folders; and
   (d) providing a means for encoding said one or more test cases into XLM format.

9. The method according to claim 8 further comprising providing a web interface wherein one or more users can create one or more sub-requirements folders using said web interface and saving said one or more sub-requirements folders in said one or more requirements folders; wherein both said requirements and said sub-requirements folders are saved in a relational database coupled to said application server that provides said web interface.

10. A computer system for web-interactive testing of GUI object functionality comprising:
   (a) an application sewer suitable as a web server operatively coupled to a database wherein said application server comprises a computer readable storage medium having computer readable code means for providing a web interface to one or more users, computer readable code means for populating said web-interface with data gathered from said database, and computer readable code means for populating said web-interface with data and means for receiving data from one or more host machines,
   (b) one or more user machines in communication with said application server suitable, said user machines comprising computer readable storage media including computer readable code means for interacting with the web interface provided by said application server, and
   (c) one or more host machines in communication with said application server, said one or more host machines comprising computer readable storage media including an automation tool, a full or partial copy of the computer readable program code of a GUI object, computer readable code means for parsing an XML encoded test case into a test script, an automation tool GUI environment file, and the computer readable program code of said software application and computer readable code means for directing said test script to be executed by said automation tool;
   (d) computer readable program code means for selecting an XML encoded teat case,
   (e) computer readable program code means for selecting a host machine,
   (f) computer readable program code means for encoding an XML test case file wherein said test case file comprises one or more GUJ o Jett test steps and the name of an automation tool GUI environment file; and
   (g) computer readable program code means for sending to a host machine said XML encoded test case file.

11. The computer system according to claim 10 wherein the application server further comprises computer readable program code means for scheduling the execution of said selected test case on said selected host machine, wherein said scheduling comprises a time and a date for executing said selected test case on said selected host machine.

12. The computer system according to claim 10 wherein the application server further comprises computer readable code means for enabling a user to author an XML encoded test case using said web interface wherein said user adds GUI test steps or modifies existing GUI test steps by selecting from a plurality of GUI objects.

13. The computer system according to claim 12 wherein said application server further comprises computer readable code means for enabling a user to modify an action, procedure, or expected result corresponding to a selected GUI object.

14. The computer system according to claim 10 wherein said one or more host machines further comprise
   (a) computer readable program code means for querying said application server whether a test case has been scheduled for execution by said host machine,
   (b) computer readable program code means for requesting the encoding into XML and the transmission of a test case file by the application server,
   (c) computer readable program code means for receiving said XML encoded test case file,
   (d) computer readable program code means for decoding said XML encoded test case file, said decoding comprising generating a test script by parsing automation tool recognized syntax from said XML encoded test case file, and resolving the name of an automation tool GUI environment file from said test case file,
   (e) computer readable program code means for requesting the transmission of and receiving said automation tool GUI environment file from the application server,
   (f) computer readable program code means for updating the application server with the status of a test case assigned to be executed on said host machine or the status of the one or more GUI object test steps included in said test case.

15. The computer system according to claim 10 wherein said application server further comprises (a) computer readable program code means for providing a web interface wherein one or more users can create one or more requirements folders using said web interface and saving said one or more requirements folders in a relational database coupled to an application server that provides said web interface, (b) computer readable program code means for providing a web-interactive interface wherein one or more users can create one or more XML encoded test cases using a web-interactive authoring tool and saving said one or more XML encoded test cases in a relational database coupled to said application server that provides said web interface, and (c) computer readable program code means for providing a web interface wherein one or more users can sort said one or more XML encoded test cases within said one or more requirements folders.

\* \* \* \* \*